United States Patent
Nakamichi et al.

(10) Patent No.: US 12,473,205 B2
(45) Date of Patent: Nov. 18, 2025

(54) BERYLLIUM SOLUTION PRODUCTION METHOD, BERYLLIUM PRODUCTION METHOD, BERYLLIUM HYDROXIDE PRODUCTION METHOD, BERYLLIUM OXIDE PRODUCTION METHOD, SOLUTION PRODUCTION DEVICE, BERYLLIUM PRODUCTION SYSTEM, AND BERYLLIUM

(71) Applicant: NATIONAL INSTITUTES FOR QUANTUM SCIENCE AND TECHNOLOGY, Chiba (JP)

(72) Inventors: Masaru Nakamichi, Chiba (JP); Jaehwan Kim, Chiba (JP); Yoshiaki Akatsu, Chiba (JP); Suguru Nakano, Chiba (JP)

(73) Assignee: NATIONAL INSTITUTES FOR QUANTUM SCIENCE AND TECHNOLOGY, Chiba (JP)

( * ) Notice: Subject to any disclaimer, the term of this patent is extended or adjusted under 35 U.S.C. 154(b) by 675 days.

(21) Appl. No.: 17/636,474

(22) PCT Filed: Aug. 27, 2020

(86) PCT No.: PCT/JP2020/032264
§ 371 (c)(1),
(2) Date: Feb. 18, 2022

(87) PCT Pub. No.: WO2021/039876
PCT Pub. Date: Mar. 4, 2021

(65) Prior Publication Data
US 2022/0315438 A1    Oct. 6, 2022

(30) Foreign Application Priority Data
Aug. 30, 2019 (JP) .................. 2019-158618

(51) Int. Cl.
  *C01F 3/00*  (2006.01)
  *C01F 3/02*  (2006.01)
  (Continued)

(52) U.S. Cl.
  CPC ............ *C01F 3/00* (2013.01); *C01F 3/02* (2013.01); *C22B 35/00* (2013.01); *C25C 3/02* (2013.01)

(58) Field of Classification Search
  None
  See application file for complete search history.

(56) References Cited

U.S. PATENT DOCUMENTS 1,511,829 A * 10/1924 Dickinson ................ C25C 3/34
                                                     205/403
3,057,684 A    10/1962 Pruvot et al.
(Continued)

FOREIGN PATENT DOCUMENTS

CN    103663506 A    3/2014
CN    105734282 A    7/2016
(Continued)

OTHER PUBLICATIONS

English translation of CN 106521192 B Description (Year: 2019).*
English translation of CN 105734282 A (Year: 2016).*
Stefaniak, A. B., et al. Characteristics of beryllium oxide and beryllium metal powders for use as reference materials. Journal of ASTM International, Nov./Dec. 2005, vol. 2, No. 10, Paper ID JAI13174. (Year: 2005).*
(Continued)

Primary Examiner — Anthony J Zimmer
Assistant Examiner — Zachary John Baum
(74) Attorney, Agent, or Firm — McCarter & English, LLP; David G. Conlin

(57) ABSTRACT

This invention has an object to provide a method for producing a beryllium solution, the method being novel and having high energy efficiency. The method (M10) for producing a beryllium solution includes a main heating step (S13) of dielectrically heating an acidic solution containing a starting material so as to generate a beryllium solution, the
(Continued)

starting material being beryllium or a substance containing beryllium.

10 Claims, 7 Drawing Sheets

(51) Int. Cl.
    *C22B 35/00*     (2006.01)
    *C25C 3/02*     (2006.01)

(56) References Cited

U.S. PATENT DOCUMENTS

| | | | |
|---|---|---|---|
| 3,669,649 | A | 6/1972 | Olson et al. |
| 5,091,160 | A | 2/1992 | Kondos et al. |
| 2005/0280816 | A1* | 12/2005 | Agrawal ............... G01N 21/643 |
| | | | 356/317 |
| 2007/0170393 | A1 | 7/2007 | Zhang |
| 2011/0182786 | A1 | 7/2011 | Burba, III |
| 2014/0314640 | A1 | 10/2014 | Ospanov et al. |
| 2015/0197826 | A1 | 7/2015 | Burba |
| 2019/0136340 | A1 | 5/2019 | Burba, III |

FOREIGN PATENT DOCUMENTS

| | | | |
|---|---|---|---|
| CN | 105734309 | A | 7/2016 |
| CN | 105907962 | A | 8/2016 |
| CN | 106521192 | A | 3/2017 |
| GB | 900698 | A | 7/1962 |
| GB | 1080253 | A * | 8/1967 |
| GB | 1252081 | A | 11/1971 |
| JP | 49-033757 | B1 | 9/1974 |
| JP | 2003-073751 | A | 3/2003 |
| JP | 2007-523096 | A | 8/2007 |
| JP | 2012-088102 | A | 5/2012 |
| JP | 2013-528696 | A | 7/2013 |

OTHER PUBLICATIONS

Wikipedia, Beryllium. Retrieved online at: https://en.wikipedia.org/w/index.php?title=Beryllium&oldid=1043595147. 23 pages, Sep. 10, 2021.
International Search Report and Written Opinion for Application No. PCT/JP2020/032263, dated Oct. 27, 2020, 14 pages.
International Search Report and Written Opinion for Application No. PCT/JP2020/032264, dated Oct. 27, 2020, 15 pages.
Office Action for Japanese Application No. 2021-542983, dated Nov. 7, 2023, 3 pages with English-language machine translation.
Akizuki, Electron microscope observations on the crack planes of beryl and quartz. Journal of the Association for the Study of Rocks and Mineral Deposits. Sep. 5, 1965;54(3):77-86, with machine translation.
Graziani, Growth of a Beryl Single Crystal—History of the Development and the Genetic Medium. J Appl Cryst. 1981;14:241-246.
Parameshwaran, Dissolution Behaviour of Beryl. Genehmigte Dissertation. von der Fakultat VI-Planen Bauen Umwelt der Technischen Universitat Berlin zur Erlangung der akademischen Grades Doktor der Naturwissenschaften. 172 pages, (2016).
Shigley et al., Gem-bearing Pegmatites: A Review. Gems & Gemology. pp. 64-77, (1984).
U.S. Appl. No. 17/636,491, filed Feb. 18, 2022, Pending.
Japanese Office Action Application No. 2024-039384, dated May 21, 2025, 3 pages.
Koop, A Study of the Hydrates of Beryllium Sulfate. Being a thesis submitted to the committee on post-graduate studies in partial fulfillment of the requirements for the degree of Master of Science. 68 pages, Sep. 1950.
Zaki et al., Extraction equilibrium of beryllium and aluminum and recovery of beryllium from Egyptian beryl solution using CYANEX 921. Hydrometallurgy. 2005;80:221-231.
US Office Action for U.S. Appl. No. 17/636,491, dated Feb. 25, 2025, 29 pages.

* cited by examiner

BERYLLIUM SOLUTION PRODUCTION METHOD, BERYLLIUM PRODUCTION METHOD, BERYLLIUM HYDROXIDE PRODUCTION METHOD, BERYLLIUM OXIDE PRODUCTION METHOD, SOLUTION PRODUCTION DEVICE, BERYLLIUM PRODUCTION SYSTEM, AND BERYLLIUM

CROSS-REFERENCE TO RELATED APPLICATIONS

This application is a 35 U.S.C. § 371 national stage filing of International Application No. PCT/JP2020/032264, filed on Aug. 27, 2020, which claims priority to Japanese Patent Application No. 2019-158618, filed on Aug. 30, 2019. The entire contents of each of the aforementioned applications are incorporated herein by reference.

TECHNICAL FIELD

The present invention relates to a method for producing a beryllium solution. The present invention also relates to a method for producing beryllium, a method for producing beryllium hydroxide, a method for producing beryllium oxide, a solution production device, a beryllium production system, and beryllium.

BACKGROUND ART

It is known that beryllium is contained in a Be—Si—O ore and a Be—Si—Al—O ore. Examples of the Be—Si—O ore encompass bertrandite and phenacite. Examples of the Be—Si—Al—O ore encompass beryl and chrysoberyl. Hereinafter, ores containing beryllium such as those described above are called beryllium ores. The beryllium ore is an example of beryllium oxide.

In order to produce any of beryllium, a compound containing beryllium, and an alloy containing beryllium, a beryllium ore is first dissolved in a solvent so that beryllium is extracted from the beryllium ore. However, it is not easy to dissolve the beryllium ore in the solvent. Although an acidic solution such as sulfuric acid is known as a solvent in which a beryllium ore is easily dissolved, the beryllium ore is difficult to be dissolved even in the acidic solution.

Non-patent Literature 1 states that subjecting a beryllium ore to a pre-treatment such as a sintering treatment or a melting treatment makes it possible to dissolve the beryllium ore in the solvent.

CITATION LIST

Non-Patent Literature

[Non-Patent Literature 1]
"Beryllium", [online], Wikipedia, [searched on Jun. 25, 2019], Internet <URL: https://en.wikipedia.org/siki/Beryllium>

SUMMARY OF INVENTION

Technical Problem

However, the pre-treatment for making the beryllium ore soluble in the solvent requires quite large energy. According to the item "Production" in Non-patent Literature 1, the temperature at which the sintering treatment is carried out is, e.g., 770° C., and the temperature at which the melting treatment is carried out is, e.g., 1650° C.

An invention in accordance with one aspect of the present invention was made in light of the above problem, and has an object to provide a method for producing a beryllium solution, the method being novel and having high energy efficiency.

Solution to Problem

A method in accordance with an aspect of the present invention for producing a beryllium solution includes a main heating step of dielectrically heating an acidic solution containing a starting material so as to produce a beryllium solution, the starting material being at least one of beryllium, an intermetallic compound containing beryllium, beryllium having a surface on which an oxidized layer is formed, and an intermetallic compound having a surface on which an oxidized layer is formed and containing beryllium.

A method in accordance with an aspect of the present invention for producing beryllium includes: each step included in the method in accordance with the aspect for producing the beryllium solution; an anhydrization step of carrying out anhydrization of the beryllium solution so as to generate beryllium salt; and an electrolyzing step of carrying out molten salt electrolysis of the beryllium salt so as to generate beryllium.

A method in accordance with an aspect of the present invention for producing beryllium hydroxide includes: each step included in the method in accordance with the aspect for producing the beryllium solution; and a neutralizing step of neutralizing, with a base, the beryllium solution so as to generate beryllium hydroxide.

A method in accordance with an aspect of the present invention for producing beryllium oxide includes: each step included in the method in accordance with the aspect for producing the beryllium solution; and a third heating step of heating the beryllium solution so as to generate beryllium oxide.

A solution production device in accordance with an aspect of the present invention includes: a main heating container; an acidic solution supplying section configured to supply an acidic solution to the main heating container; and a main heating device configured to dielectrically heat the acidic solution stored in the main heating container.

A beryllium production system in accordance with an aspect of the present invention includes: the solution production device in accordance with the aspect of the present invention; an anhydrization device configured to carry out anhydrization of the beryllium chloride solution so as to generate beryllium chloride; and an electrolyzing device configured to carry out molten salt electrolysis of the beryllium chloride so as to generate beryllium.

Beryllium in accordance with an aspect of the present invention contains uranium at a concentration of less than 0.7 ppm.

Advantageous Effects of Invention

In accordance with an aspect of the present invention, it is possible to provide a method for producing a beryllium solution, the method being novel and having high energy efficiency.

Figure 2:
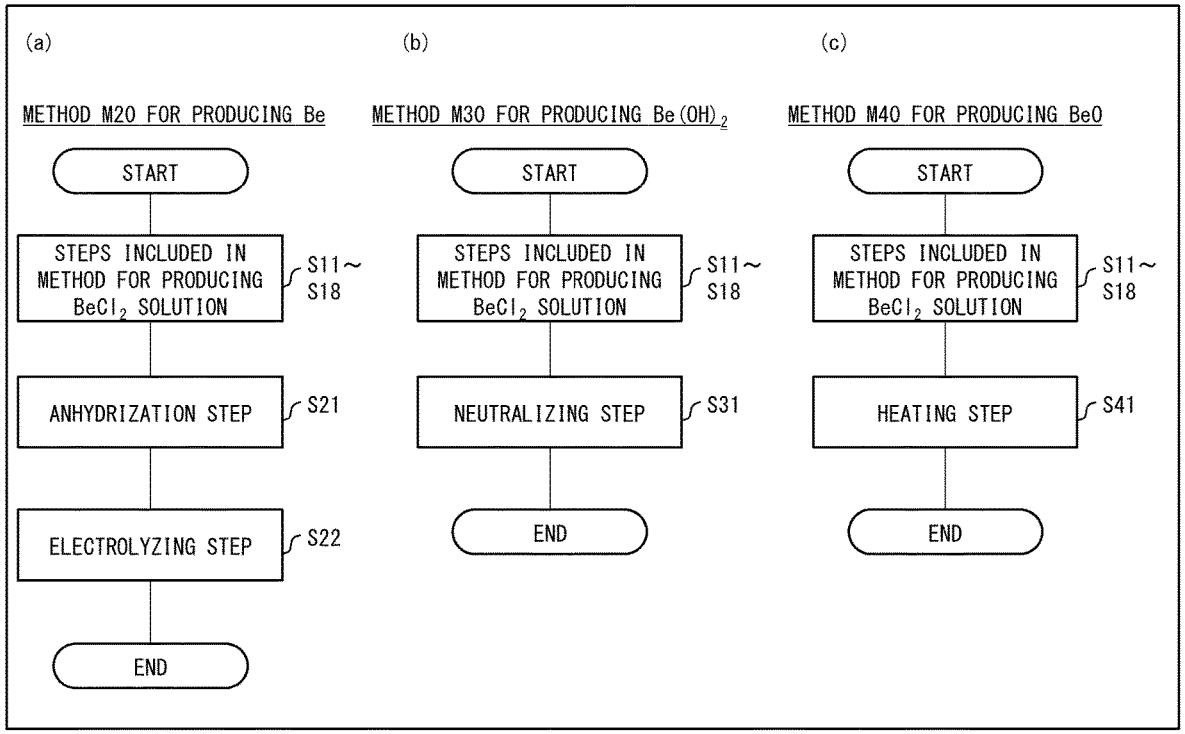

(a) to (c) of FIG. 2 respectively show a flowchart illustrating a method in accordance with Embodiment 2 of the present invention for producing beryllium, a flowchart illustrating a method in accordance with Embodiment 3 of the present invention for producing beryllium hydroxide, and a flowchart illustrating a method in accordance with Embodiment 4 of the present invention for producing beryllium oxide.

Figure 3:
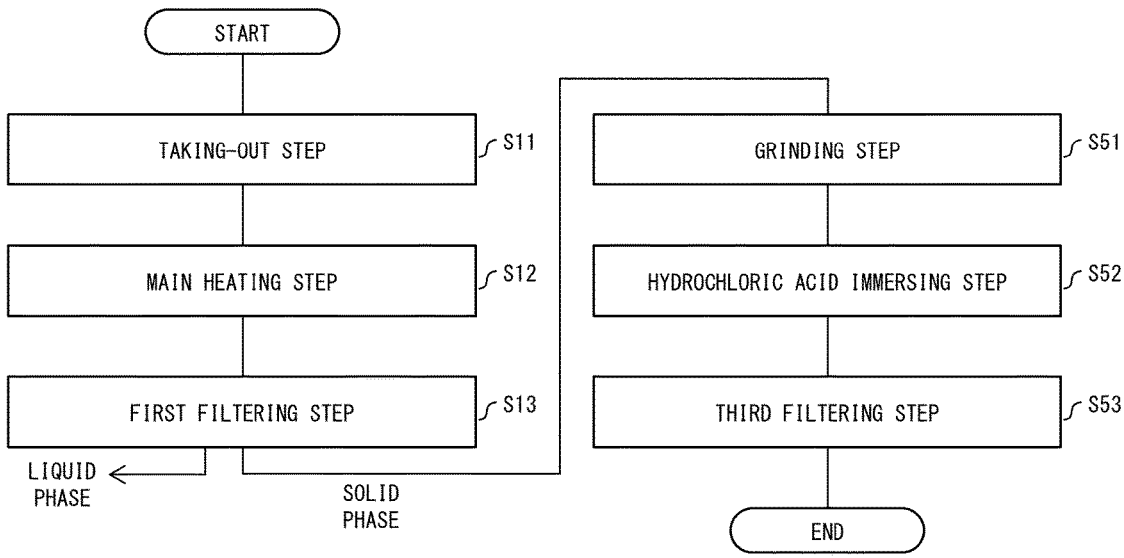

FIG. 3 shows a flowchart illustrating a method in accordance with Embodiment 5 of the present invention for separating titanium and lithium from each other.

Figure 4:
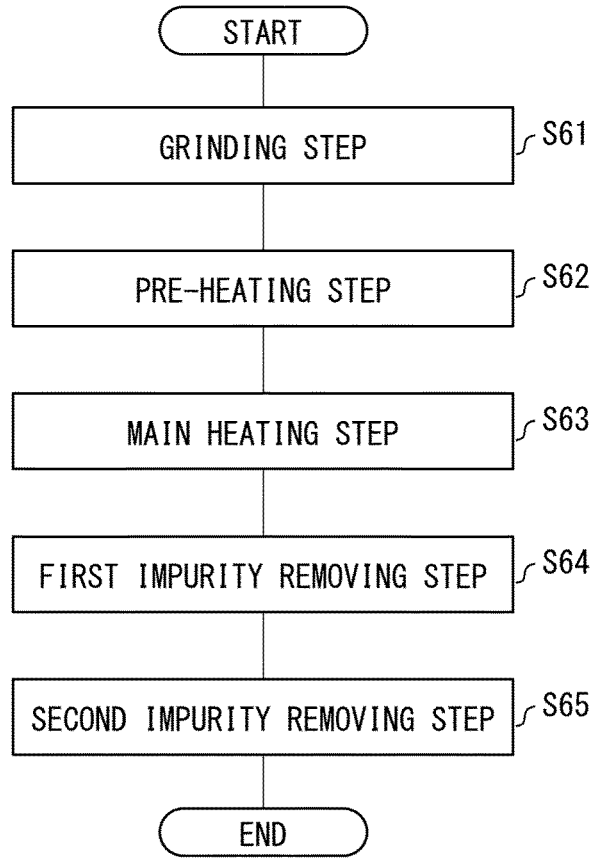

FIG. 4 shows a flowchart illustrating a method in accordance with Embodiment 6 of the present invention for producing a lithium chloride solution.

Figure 5:
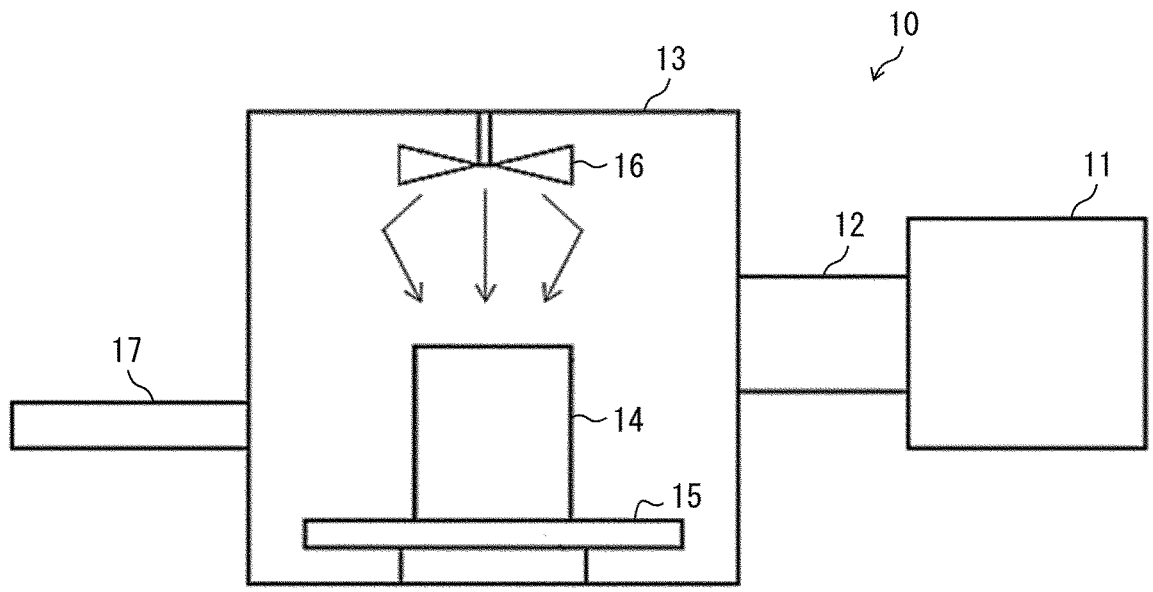

FIG. 5 is a view schematically illustrating a beryllium solution production device in accordance with Embodiment 7 of the present invention.

Figure 6:
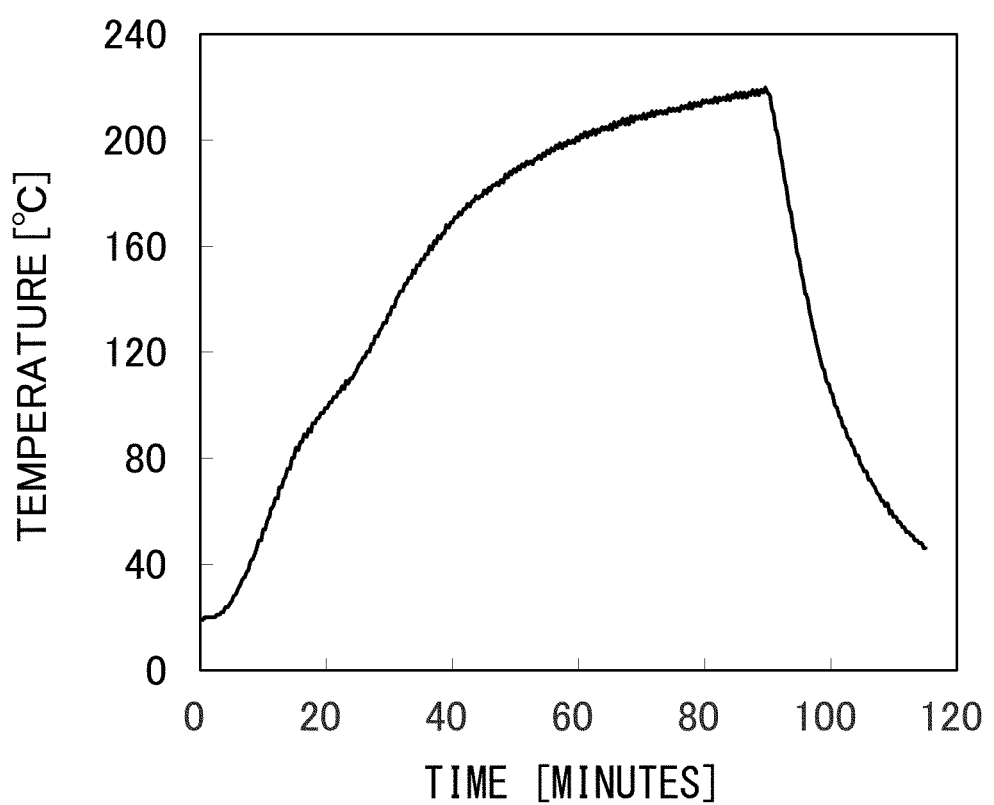

FIG. 6 shows a graph showing a change in temperature of a container observed when a main heating step was carried out with use of the beryllium solution production device shown in FIG. 5.

Figure 7:
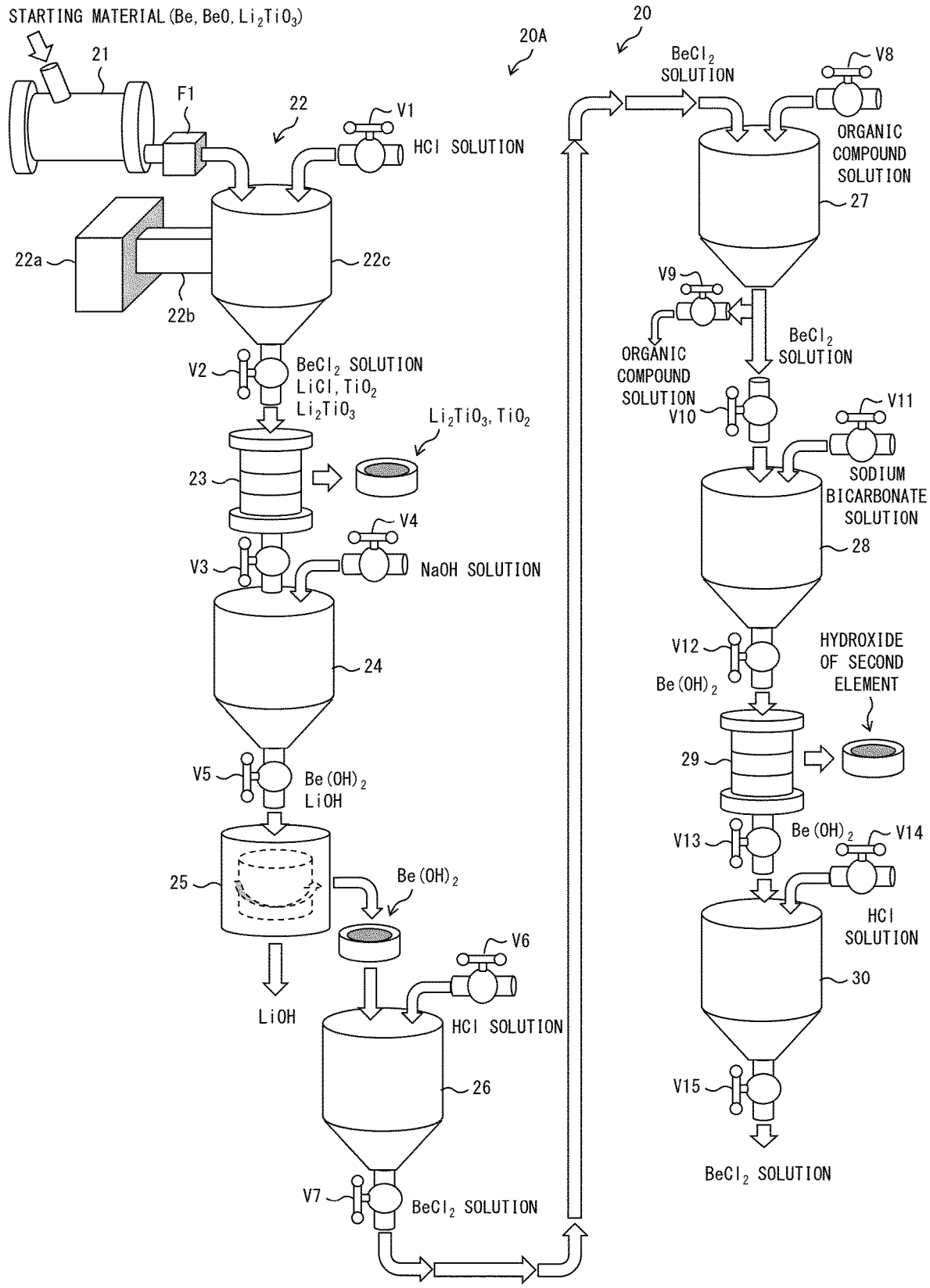

FIG. 7 is a view schematically illustrating a beryllium solution production device included in a beryllium production system in accordance with Embodiment 8 of the present invention.

Figure 8:
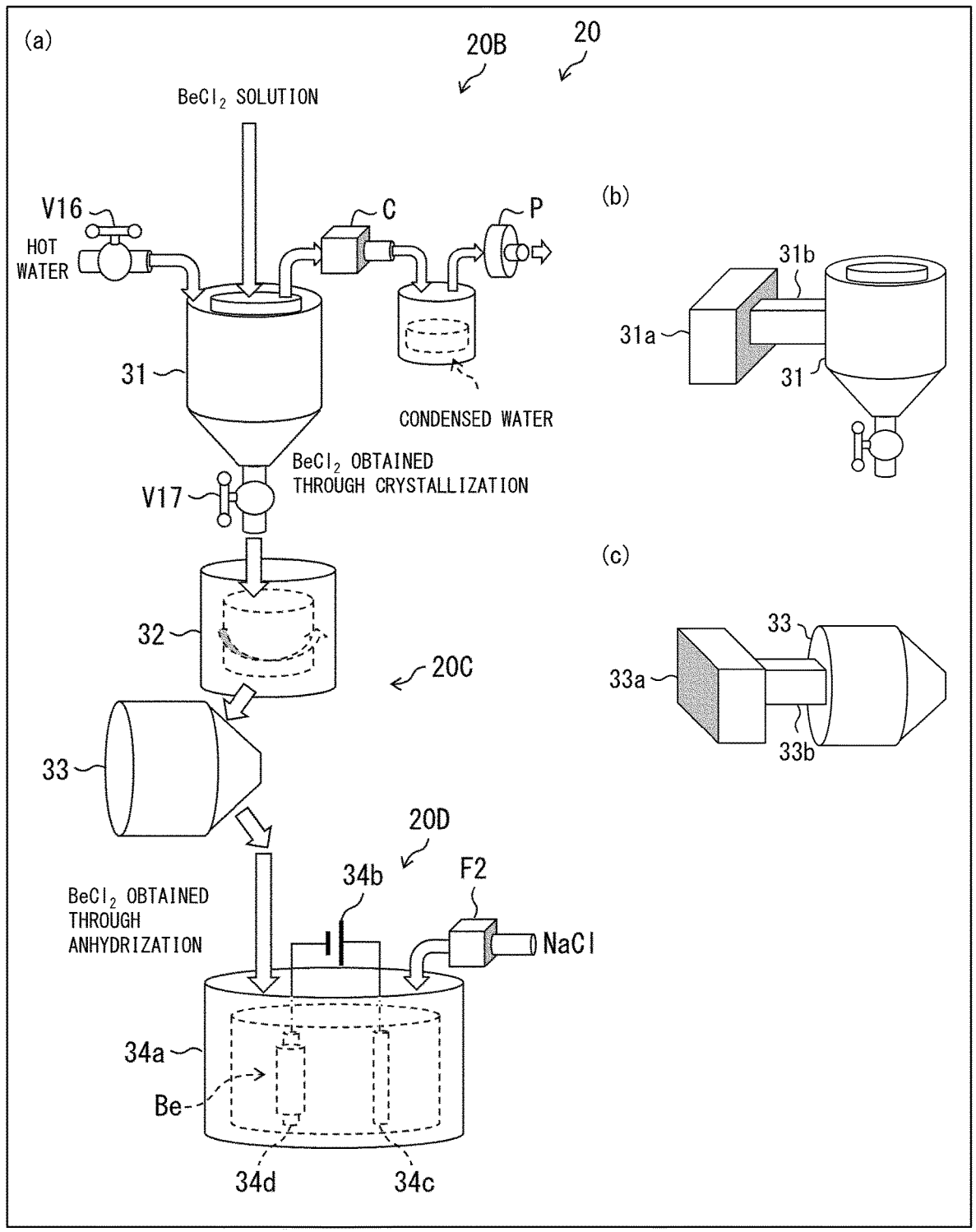

(a) of FIG. 8 is a view schematically illustrating a crystallizer, an anhydrization device, and an electrolyzing device included in the beryllium production system in accordance with Embodiment 8 of the present invention. (b) of FIG. 8 is a view schematically illustrating a variation of a crystallization treatment tank included in the crystallizer shown in (a) of FIG. 8. (c) of FIG. 8 is a view schematically illustrating a variation of a dryer included in the anhydrization device shown in (a) of FIG. 8.

Figure 9:
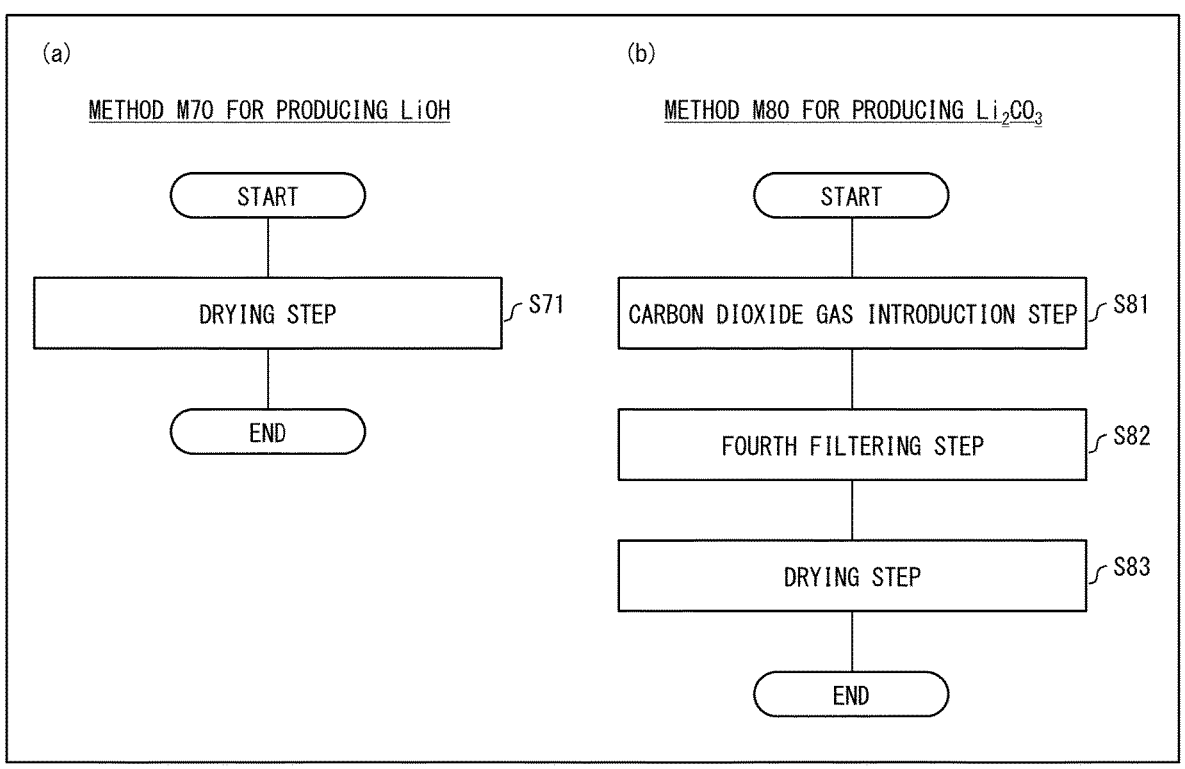

(a) of FIG. 9 shows a flowchart illustrating a method in accordance with Embodiment 9 of the present invention for producing lithium hydroxide, and (b) of FIG. 9 shows a flowchart illustrating a method in accordance with Embodiment 10 of the present invention for producing lithium carbonate.

DESCRIPTION OF EMBODIMENTS

Embodiment 1

(Method M10 for Producing Beryllium Solution)

Figure 1:
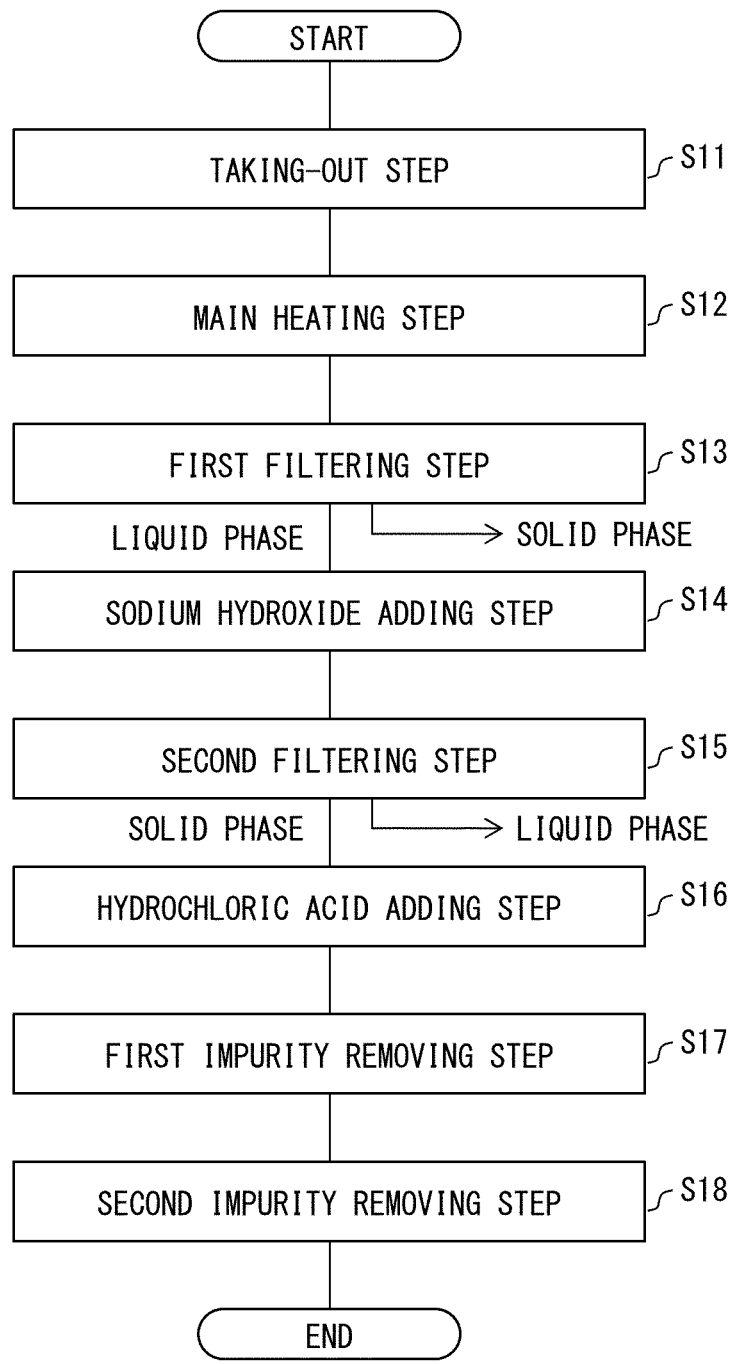
FIG. 1 is a flowchart illustrating a method in accordance with Embodiment 1 of the present invention for producing a beryllium chloride solution.

The following description will discuss a method M10 for producing a beryllium solution in accordance with Embodiment 1 of the present invention with reference to FIG. 1. FIG. 1 shows a flowchart of the method M10 for producing the beryllium solution. Hereinafter, the method M10 for producing the beryllium solution may also simply be referred to as a production method M10. The following description in Embodiment 1 will discuss a method for producing a $BeCl_2$ solution, which is an aqueous solution of beryllium chloride ($BeCl_2$) that is a hydrochloride of beryllium. However, the beryllium solution to be produced by the production method M10 is not limited to the $BeCl_2$ solution, but may be a $BeSO_4$ solution, a $Be(NO_3)_2$ solution, a $BeF_2$ solution, a $BeBr_2$ solution, or a $BeI_2$ solution. The $BeSO_4$ solution is an aqueous solution of beryllium sulfate ($BeSO_4$), which is a sulfate of beryllium. The $Be(NO_3)_2$ solution is an aqueous solution of beryllium nitrate (Be$(NO_3)_2$), which is a nitrate of beryllium. The $BeF_2$ solution is an aqueous solution of beryllium fluoride ($BeF_2$), which is a hydrofluoric acid salt of beryllium. The $BeBr_2$ solution is an aqueous solution of beryllium bromide ($BeBr_2$), which is a hydrobromide of beryllium. The $BeI_2$ solution is an aqueous solution of beryllium iodide ($BeI_2$), which is a hydroiodide of beryllium.

As shown in FIG. 1, the production method M10 includes a taking-out step S11, a main heating step S12, a first filtering step S13, a sodium hydroxide adding step S14, a second filtering step S15, a hydrochloric acid adding step S16, a first impurity removing step S17, and a second impurity removing step S18.

(Taking-Out Step S11)

The taking-out step S11 is a step of taking out, from a blanket, a used tritium breeder material and a used neutron multiplying material filled inside the blanket of a nuclear fusion reactor. In the production method M10, the used tritium breeder material and the used neutron multiplying material are used as a starting material.

Examples of the tritium breeder material encompass lithium oxide. Specific examples of the lithium oxide encompass lithium titanate ($Li_2TiO_3$), lithium oxide ($Li_2O$), lithium aluminate ($LiAlO_2$), and lithium silicate ($Li_2SiO_3$ and/or $Li_4SiO_4$). Examples of the neutron multiplying material encompass beryllium (Be) and intermetallic compounds containing beryllium ($Be_{12}Ti$ and/or $Be_{12}V$, such compounds may also be referred to as beryllide). Each of the tritium breeder material and the neutron multiplying material is formed into a quite small spherical shape having a diameter of approximately 1 mm. Inside the blanket, the tritium breeder material and the neutron multiplying material mixed as uniform as possible are filled. Thus, the starting material taken out from the blanket in the taking-out step S11 is a mixture of the tritium breeder material and the neutron multiplying material. The description in Embodiment 1 will discuss the production method M10 that uses (a) lithium titanate as an example of the tritium breeder material and (b) beryllium having a surface on which an oxidized layer is formed as an example of the neutron multiplying material. The tritium breeder material and/or the neutron multiplying material used as the starting material in the production method M10 are not limited to lithium titanate and beryllium, and may be selected as appropriate from the above-indicated examples.

Note that, even after beryllium is used as the neutron multiplying material, most part (e.g., approximately 98%) thereof is still beryllium. Thus, for the purpose of reducing the operating cost of the nuclear fusion reactor, it is strongly required to establish a technique for reusing beryllium, which is an expensive element, by turning beryllium into a beryllium solution. Meanwhile, used beryllium has a surface on which a layer of beryllium oxide (BeO) is formed. Therefore, merely by immersing the used beryllium in an acidic solution, beryllium contained in the used beryllium is hardly dissolved.

As described above, the starting material used in the production method M10 encompass at least any of (1) beryllium, (2) an intermetallic compound containing beryllium, (3) beryllium having a surface on which an oxidized layer is formed, and (4) an intermetallic compound having a surface on which an oxidized layer is formed and containing beryllium, each of which can function as a neutron multiplying material. The starting material used in the production method M10 may further contain lithium oxide that can function as a tritium breeder material.

The starting material used in the production method M10 is not limited to the neutron multiplying material and the tritium breeder material having been used in the nuclear fusion reactor. The starting material may be beryllium having been used in the atomic field other than the nuclear fusion field and the accelerator field and an alloy containing such beryllium, or may be beryllium generated as an industrial waste in general industrial fields and an alloy containing such beryllium. In accordance with the production method M10, it is possible to produce beryllium by processing (1) a used neutron multiplying material and a used tritium breeder material generated in the nuclear fusion reactor, (2) a used neutron reflector generated in the atomic field other than the nuclear fusion field and the accelerator field, a used neutron moderator, beryllium and an alloy thereof contained in a used target material as a neutron source or the like, and (3) beryllium and an alloy thereof generated as an industrial waste in general industrial fields, without distinction between them. In addition, in accordance with the production method M10, it is possible to remove uranium, other element(s), and/or the like contained as impurities in the starting material.

(Grinding Step)

In addition, between the taking-out step S11 and the main heating step S12, the grinding step of grinding the starting material may be carried out. The grinding step is a step of grinding the starting material to reduce the particle diameter of the starting material and to mechanically break, even for a neutron multiplying material having a surface on which an oxidized layer is formed, the oxidized layer so that beryllium having been covered with the oxidized layer is exposed. The technique used to grind the starting material is not limited to any particular one, and may be selected from existing techniques as appropriate. Such a technique may be a technique involving use of a ball mill, for example.

(Main Heating Step S12)

The main heating step S12 is a step that is to be carried out after the taking-out step S11 and that dielectrically heats the acidic solution containing the starting material. By carrying out the main heating step S12, beryllium that is a neutron multiplying material is dissolved, and an acidic solution in which most of lithium contained in lithium titanate that is a tritium breeder material is dissolved is generated. Hereinafter, this acidic solution may also be referred to as a beryllium solution containing lithium. Note that, even when being subjected to the main heating step S12, part of lithium titanate and part of titanium oxide would not be dissolved, but exist as a solid phase in the acidic solution.

The acidic solution is not limited to any particular one. The aqueous solution can be an aqueous solution of any of hydrogen chloride (HCl), sulfuric acid ($H_2SO_4$), nitric acid ($HNO_3$), hydrogen fluoride (HF), hydrogen bromide (HBr), and hydrogen iodide (HI), each of which is an acidic solute. In Embodiment 1, an HCl solution is used as the acidic solution. The concentration of HCl in the HCl solution can be adjusted as appropriate. Preferably, the concentration of HCl in the HCl solution is adjusted to have a pH of not more than 1.

The dielectric heating is a generic term for techniques for applying, to a target object, an electromagnetic wave having a given frequency so as to heat the target object. According to the band of the electromagnetic wave to be applied, the dielectric heating is called radio-frequency heating or microwave heating. For example, the radio-frequency heating applies, to the target object, an electromagnetic wave (a so-called short wave or an ultrashort wave) within a band of not less than 3 MHz and less than 300 MHz, whereas the microwave heating applies, to the target object, an electromagnetic wave (a so-called microwave) within a band of not less than 300 MHz and less than 30 GHz. A microwave oven, which is widely used also in home, is an example of a device that can carry out the microwave heating.

In Embodiment 1, the main heating step S12 applies, to the beryllium solution containing lithium, an electromagnetic wave having a frequency of 2.45 GHz. The configuration of the device that applies an electromagnetic wave to the beryllium solution containing lithium will be described later with reference to FIG. 5 or FIG. 7.

By heating the acidic solution containing the starting material through the dielectric heating, it is possible to dissolve the starting material in the acidic solution with higher energy efficiency than conventional. Specifically, it is possible to yield a hydrochloric acidic solution in which beryllium chloride hydrate ($BeCl_2 \cdot xH_2O$) and lithium chloride (LiCl) are dissolved. Thus, the production method M10 can be provided as a novel production method with high energy efficiency.

A heating temperature in the main heating step S12 can be set as appropriate. The heating temperature in the main heating step S12 is preferably equal to or lower than a heatproof temperature of a container (e.g., a main heating container 14 described in Embodiment 7) storing the acidic solution containing the starting material. For example, in a case where the container is made of polytetrafluoroethylene (e.g., the main heating container 14), the heating temperature in the pre-heating step S12 is preferably not higher than 250° C. In a case where the container is made of a material having corrosion resistance against the acidic solution and a heatproof temperature higher than 250° C., the heating temperature in the main heating step S12 may be higher than 250° C. It is highly probable that increasing the heating temperature in the main heating step S12 will shorten the period of time taken for the main heating step S12. The heating temperature in the main heating step S12 is preferably not lower than 180° C. By setting the heating temperature so as to be not lower than 180° C., more beryllium and more lithium contained in the starting material can be dissolved in the solution as beryllium chloride hydrate and lithium chloride, respectively. A heating time in the main heating step S12 can also be set as appropriate. Preferably, the heating time is not less than 60 minutes, for example.

(Pre-Heating Step)

Note that, there may be a case where beryllium is dissolved in the acidic solution at a low rate when being subjected to the main heating step S12 alone. In other words, there may be a case where beryllium is dissolved insufficiently when being subjected to the main heating step S12 carried out at a given heating temperature for a given heating time. In such a case, the production method M10 may include a pre-heating step that is to be carried out prior to the main heating step S12.

Of the above-described examples of the neutron multiplying material, beryllium having a surface on which an oxidized layer is formed and an intermetallic compound having a surface on which an oxidized layer is formed and containing beryllium respectively have thick oxidized layers in some cases. In such a case, beryllium is dissolved in the acidic solution at a low rate when being subjected to the main heating step S12 alone. In such a case, it is preferable to carry out a pre-heating step before the main heating step S12.

The pre-heating step is a step of dielectrically heating a basic solution containing the starting material. The basic solution is not limited to any particular one, and may be an aqueous solution of sodium hydroxide (NaOH) or an aqueous solution of potassium hydroxide (KOH), each of which is a basic solute. In Embodiment 1, a NaOH solution is used as the basic solution. The concentration of NaOH in the NaOH solution can be adjusted as appropriate. Preferably, this concentration is adjusted to have a pH of not less than 14.

The dielectric heating carried out in the pre-heating step is similar to that carried out in the main heating step S12. That is, in Embodiment 1, the pre-heating step applies, to the NaOH solution containing the starting material, an electromagnetic wave having a frequency of 2.45 GHz.

Carrying out the pre-heating step before the main heating step S12 forms plural reaction parts, e.g., corrosion, dissolution, collapse, and/or the like, in some parts of the surface texture of the surface of the starting material. The shape of each reaction part is not limited to any particular one. For example, the shape of the reaction part may be a recess. As compared to the surface of the starting material having not been subjected to the pre-heating step yet, the surface of the starting material in which the plural reaction parts are formed are fragile. Thus, by carrying out the main heating step S12 on the starting material having been subjected to the pre-heating step, the starting material can easily be dissolved in an acidic solution. As discussed above, with the production method M10 including the pre-heating step, it is possible to easily dissolve the starting material that is difficult to be dissolved when being subjected to the main heating step S12 alone. Thus, even in a case where the starting material that is relatively difficult to be dissolved in an acidic solution is used, it is possible to produce a beryllium solution containing lithium by carrying out the pre-heating step and the main heating step S12.

(First Filtering Step S13)

The first filtering step S13 is a step that is to be carried out after the main heating step S12. The first filtering step S13 is a step of separating, with use of a filter, a solid phase and a liquid phase contained in the beryllium solution containing lithium from each other. The solid phase contains a part of the lithium titanate and a part of the titanium oxide. The liquid phase that is the acidic solution contains beryllium chloride hydrate and lithium chloride.

By carrying out the first filtering step S13, it is possible to easily separate (a) the titanium oxide contained in the solid phase and (b) the beryllium chloride hydrate and the lithium chloride contained in the liquid phase from each other.

(Sodium Hydroxide Adding Step S14)

The sodium hydroxide adding step S14 is a step that is to be carried out after the first filtering step S13. The sodium hydroxide adding step S14 is a step of adjusting the polarity of the acidic solution from acidity to neutrality, and then to basicity, the acidic solution having been obtained as a result of separation carried out in the first filtering step S13, containing the beryllium chloride hydrate and the lithium chloride each of which is the liquid phase, and not containing the titanium oxide that is the solid phase.

In Embodiment 1, the sodium hydroxide adding step S14 is defined to add an aqueous sodium hydroxide solution to the acidic solution having been obtained as a result of separation carried out in the first filtering step S13. As a result, the polarity of the solution separated in the first filtering step S13 is changed from acidity to neutrality (pH 7), and then to basicity. Consequently, the beryllium chloride hydrate contained in the solution is turned into beryllium hydroxide ($Be(OH)_2$), so as to be precipitated as a solid phase in the basic solution. Note that the lithium chloride is dissolved in the basic solution, and would not be precipitated. That is, even after the sodium hydroxide adding step S14 is carried out, the lithium chloride still exists as the lithium hydroxide in the liquid phase.

(Second Filtering Step S15)

The second filtering step S15 is a step that is to be carried out after the sodium hydroxide adding step S14. The second filtering step S15 is a step of separating, with use of a filter, the solid phase and the liquid phase contained in the basic solution obtained through the sodium hydroxide adding step S14 from each other. The solid phase contains the beryllium hydroxide, and the liquid phase contains the lithium hydroxide.

By carrying out the second filtering step S15, it is possible to easily separate the beryllium hydroxide contained in the solid phase and the lithium hydroxide contained in the liquid phase from each other.

(Hydrochloric Acid Adding Step S16)

The hydrochloric acid adding step S16 is a step that is to be carried out after the second filtering step S15. The hydrochloric acid adding step S16 is a step of adding an HCl solution to the beryllium hydroxide obtained through the second filtering step S15 so that beryllium is dissolved, as beryllium chloride hydrate, in an acidic solution again. The concentration of HCl in the HCl solution can be adjusted as appropriate. Preferably, the concentration of HCl in the HCl solution is adjusted to have a pH of not more than 1.

By carrying out the hydrochloric acid adding step S16, it is possible to obtain a hydrochloric acidic solution in which the beryllium chloride hydrate is dissolved (such a solution may also be referred to as a beryllium solution or a $BeCl_2$ solution).

(First Impurity Removing Step S17)

The first impurity removing step S17 is a step that is to be carried out after the hydrochloric acid adding step S16. The first impurity removing step S17 is a step of removing, with use of an organic compound that adsorbs a first element, the first element from the beryllium solution obtained through the hydrochloric acid adding step S16.

The first element to be removed in the first impurity removing step S17 varies depending on the organic compound used here. Examples of the organic compound that can be used in the first impurity removing step S17 encompass tri-n-octylphosphine oxide (TOPO), di-(2-ethylhexyl) phosphoric acid (D2EHPA), tri-n-butyl phosphate (TBP), and ethylenediaminetetraacetic acid (EDTA). Examples of a commercially-available organic compound that can be used in the first impurity removing step S17 encompass UTEVA (registered trademark) resin available from Eichrom Technologies.

TOPO can adsorb Al, Au, Co, Cr, Fe, Hf, Re, Ti, $UO_2^{2+}$, V, Zr, rare earth elements, and actinoid elements. D2EHPA can adsorb U, Co, Ni, Mn, and the like. TBP can adsorb U, Th, and the like. EDTA and similar ones can adsorb Mg, Ca, Ba, Cu, Zn, Al, Mn, Fe, and the like. UTEVA (registered trademark) resin can adsorb U, Th, Pu, Am, and the like. These elements are examples of the first element.

Any of the organic compounds can be dissolved in an organic solvent (e.g., kerosene, cyclohexane, benzene). The HCl solution that has undergone the hydrochloric acid adding step S16 is mixed with the solution in which any of these organic compounds is dissolved (hereinafter, such a solution may also be referred to as an organic compound solution), and a resultant is stirred. Consequently, the organic compound adsorbs the first element.

In the first impurity removing step S17, the HCl solution with which the organic compound solution is to be mixed is preferably acidic, and preferably has a pH of not more than 2. With this configuration, it is also possible to enhance the efficiency at which the organic compound adsorbs the first element, while avoiding a phenomenon that the organic compound adsorbs beryllium. Note that, as the property of the HCl solution gets becomes closer to neutrality, the efficiency at which the organic compound adsorbs beryllium increases and the efficiency at which the organic compound adsorbs the first element decreases.

In Embodiment 1, the organic compound and the organic solvent used in the first impurity removing step S17 are TOPO and kerosene, respectively. However, the organic compound and the organic solvent are not limited to TOPO and kerosene, and can be selected as appropriate from among the combinations shown as examples above.

A mixture of the beryllium solution, which is an aqueous solution, obtained through the hydrochloric acid adding step S16 and the organic compound solution is separated into two layers after being left for a while. Thus, the beryllium solution in which the content of the first element has been reduced as a result of the first impurity removing step S17 and the organic solvent containing the first element can easily be separated from each other.

By carrying out the first impurity removing step S17, it is possible to reduce the concentration of the first element in the beryllium solution. Consequently, even in a case where, in a process for dissolving a starting material in an acidic solution so as to produce a beryllium solution, the starting material contains a first element that is an element other than beryllium such as those described above, it is possible to reduce the concentration of the first element in the beryllium solution used to produce any of beryllium, beryllium hydroxide, and beryllium oxide. Examples of the first element encompass uranium, thorium, plutonium, and americium.

Specifically, for example, in a case where beryllium is produced with use of beryllium chloride obtained by the production method M10 including the first impurity removing step S17, it is possible to reduce the concentration of uranium in beryllium so as to be less than 0.7 ppm. Beryllium containing uranium at a concentration of less than 0.7 ppm exhibits a uranium concentration lower than a threshold that determines whether shallow-land disposal is allowed, even after being used as a neutron multiplying material in a nuclear fusion reactor. Thus, beryllium encompassed in an aspect of the present invention can be subjected to shallow-land disposal without any treatment even after being used as a neutron multiplying material in a nuclear fusion reactor.

(Second Impurity Removing Step S18)

The second impurity removing step S18 is a step that is to be carried out after the first impurity removing step S17 and that adjusts the polarity of the beryllium solution from acidity to neutrality, and then to basicity so as to remove a second element from the beryllium solution, the beryllium solution having been obtained through the hydrochloric acid adding step S16. In the description in Embodiment 1, the first impurity removing step S17 and the second impurity removing step S18 are carried out in this order after the hydrochloric acid adding step S16. Alternatively, the order of the first impurity removing step S17 and the second impurity removing step S18 can be changed.

In Embodiment 1, the second impurity removing step S18 adds, to the beryllium solution that has undergone the hydrochloric acid adding step S16, sodium bicarbonate ($NaHCO_3$) until sodium bicarbonate is saturated. Consequently, after the polarity of the beryllium solution is changed to exceed neutrality (pH 7), an element(s) (e.g., Al and/or Fe) other than beryllium is/are turned into hydroxide(s) (e.g., $Al(OH)_3$ and/or $Fe(OH)_3$) so as to be precipitated in the beryllium solution. Even in a state in which sodium bicarbonate is saturated, $Be(OH)_2$ is dissolved in the beryllium solution and would not be precipitated. As described above, aluminum (Al) and iron (Fe) are examples of the second element.

The hydroxide(s) of the element(s) other than beryllium precipitated in the beryllium solution as a result of the second impurity removing step S18 can easily be removed from the beryllium solution by filtering the beryllium solution.

It is preferable to add HCl again to the beryllium solution from which the second element has been removed as a result of the second impurity removing step S18. By adding HCl again to the beryllium solution, the polarity of the $Be(OH)_2$ solution is adjusted to neutrality, and then to acidity. Consequently, in the solution, a highly pure beryllium chloride hydrate ($BeCl_2 \cdot xH_2O$) is generated.

By carrying out the second impurity removing step S18, it is possible to reduce the concentration of the second element in the beryllium solution. Consequently, even in a case where, in a process for dissolving a starting material in an acidic solution so as to produce a beryllium solution, the starting material contains a second element that is an element other than beryllium such as those described above, it is possible to reduce the concentration of the second element in the beryllium solution used to produce any of beryllium, beryllium hydroxide, and beryllium oxide.

As described above, in the production method M10, the main heating step S12 preferably dielectrically heats the acidic solution containing beryllium oxide by applying a microwave to the acidic solution.

In a case where the production method M10 includes the pre-heating step, it is preferable that, similarly to the main heating step S12, the pre-heating step dielectrically heat the basic solution containing the beryllium oxide by applying a microwave to the basic solution.

The technique of the dielectric heating involving use of a microwave (i.e., microwave dielectric heating) is a technique used for so-called microwave ovens, that is, a widely-used technique. Therefore, the production method M10 can reduce the cost required to carry out the production method M10, as compared to conventional production methods.

As described above, in the production method M10, the beryllium solution is preferably a beryllium chloride solution.

With the production method M10, it is possible to easily produce the beryllium chloride solution while skipping the phase of beryllium hydroxide. From the beryllium chloride solution, it is possible to easily produce beryllium, beryllium hydroxide, and beryllium oxide, as will be described later. Therefore, the beryllium chloride solution is suitable as the beryllium solution.

Embodiments 2 to 4

With reference to (a) to (c) of FIG. 2, the following description will discuss a method M20 for producing beryllium (Be), a method M30 for producing beryllium hydroxide ($Be(OH)_2$), and a method M40 for producing beryllium oxide (BeO) in accordance with Embodiments 2 to of the present invention. (a) to (c) of FIG. 2 show a flowchart indicating the main part of the method M20 for producing beryllium, a flowchart of the main part of the method M30 for producing beryllium hydroxide, and a flowchart of the main part of the method M40 for producing beryllium oxide, respectively. Hereinafter, the method M20 for producing beryllium, the method M30 for producing beryllium hydroxide, and the method M40 for producing beryllium oxide may simply be referred to as the production method M20, the production method M30, and the production method M40, respectively.

(Method M20 for Producing Beryllium)

As shown in FIG. 2, the production method M20 includes the taking-out step S11, the main heating step S12, the first impurity removing step S13, the sodium hydroxide adding step S14, the second filtering step S15, the first impurity removing step S17, and the second impurity removing step S18, each of which is included in the production method M10 shown in FIG. 1, as well as an anhydrization step S21 and an electrolyzing step S22. Hereinafter, the taking-out step S11, the main heating step S12, the first filtering step S13, the sodium hydroxide adding step S14, the second filtering step S15, the first impurity removing step S17, and the second impurity removing step S18 may also be referred to simply as the steps S11 to S18, respectively.

The steps S11 to S18 of the production method M10 that are included in the production method M20 are similar to the steps S11 to S18 described in Embodiment 1. Therefore, a description of steps S11 to S18 is omitted here. That is, on the basis of an assumption that a $BeCl_2$ solution has been obtained by dissolving $BeCl_2$ in an HCl solution, the description of the production method M20 will deal with only the anhydrization step S21 and the electrolyzing step S22.

The anhydrization step S21 is a step of carrying out anhydrization of the beryllium chloride hydrate ($BeCl_2 \cdot xH_2O$) contained in the $BeCl_2$ solution obtained through steps S11 to S15 of the production method M10 so that $BeCl_2$, which is an example of beryllium salt, is generated.

The anhydrization step S21 adds ammonium chloride to the beryllium chloride hydrate, and heats the beryllium chloride hydrate in a vacuum at 90° C. for 24 hours. This can make the moisture content almost zero. That is, this can make the beryllium chloride hydrate anhydrous.

The ammonium chloride reacts with the moisture in the beryllium chloride hydrate, so as to be turned into ammonium chloride and hydrochloric acid. The ammonium chloride and the hydrochloric acid thus generated react with each other again, and are turned back into ammonium chloride while discharging water. As a result of the process carried out in this manner, it is possible to obtain beryllium chloride through anhydrization of the beryllium chloride hydrate.

The heating temperature in the anhydrization step S21 is not limited to 90° C., and may be selected as appropriate from a temperature range of not lower than 80° C. and not higher than 110° C. However, setting the heating temperature too high often causes insufficient anhydrization of the beryllium chloride hydrate. Therefore, the heating temperature is preferably not lower than 80° C. and not higher than 90° C., and more preferably is 90° C.

The period of time taken for the anhydrization treatment in the anhydrization step S21 is not limited to 24 hours, and may be set as appropriate.

The electrolyzing step S22 is a step of carrying out molten salt electrolysis of $BeCl_2$ obtained through the anhydrization step S21 so as to generate metal beryllium.

As described above, by carrying out the production method M20, it is possible to produce metal beryllium from a starting material.

(Method M30 for Producing Beryllium Hydroxide)

As shown in FIG. 2, the production method M30 includes the steps S11 to S15 of the production method M10 as well as a neutralizing step S31. As is the case with the production method M20, the description here will deal with only the neutralizing step S31.

The neutralizing step S31 is a step of neutralizing, with a base, $BeCl_2 \cdot xH_2O$ contained in the $BeCl_2$ solution obtained through the steps S11 to S15 of the production method M10 so as to generate $Be(OH)_2$.

As described above, by carrying out the production method M30, it is possible to produce $Be(OH)_2$ from a starting material.

(Method M40 for Producing Beryllium Oxide)

As shown in FIG. 2, the production method M40 includes the steps S11 to S15 of the production method M10 as well as a heating step S41. As is the case with the production method M20, the description here will deal with only the heating step S41.

The heating step S41 is a third heating step of heating the $BeCl_2$ solution obtained through the steps S11 to S15 of the production method M10 so as to generate BeO. As a result of the third heating step, $BeCl_2 \cdot xH_2O$ dissolved in the $BeCl_2$ solution is hydrolyzed to generate BeO.

As described above, by carrying out the production method M40, it is possible to produce BeO from a starting material.

Conclusion

In accordance with these production methods M20, M30, and M40, it is possible to produce beryllium, beryllium hydroxide, and beryllium oxide by a novel production method with high energy efficiency. Note that each of the anhydrization step S21, the electrolyzing step S22, the neutralizing step S31, and the heating step S41 can be carried out by utilizing an existing technique.

Embodiment 5

(Method M50 for Separating Titanium and Lithium from Each Other)

With reference to FIG. 3, the following will discuss a method M50 for separating titanium and lithium from each other in accordance with Embodiment 5 of the present invention. FIG. 3 shows a flowchart of the method M50 for separating titanium and lithium from each other. Hereinafter, the method M50 for separating titanium and lithium from each other may simply be referred to as a separating method M50.

As shown in FIG. 3, the separating method M50 includes the taking-out step S11, the main heating step S12, and the first filtering step S13, each of which is included in the production method M10 shown in FIG. 1, as well as a grinding step S51, a hydrochloric acid immersing step S52, and a third filtering step S53. Hereinafter, the taking-out step S11, the main heating step S12, and the first filtering step S13 may simply be referred to as the steps S11 to S13, respectively.

The steps S11 to S13 of the production method M10 that are included in the production method M50 are similar to the steps S11 to S13 described in Embodiment 1. Therefore, a description of the steps S11 to S13 is omitted here. That is, on the basis of an assumption that the lithium titanate contained in the solid phase and the beryllium chloride hydrate and the lithium chloride contained in the liquid phase have been separated from each other, the description of the separating method M50 will deal with only the grinding step S51, the hydrochloric acid immersing step S52, and the third filtering step S53. The solid phase that has undergone the step S13 may contain not only the lithium titanate but also the titanium oxide.

The grinding step S51 is a step of grinding the lithium titanate contained in the solid phase that has undergone the first filtering step S13 so as to reduce the particle diameter of the lithium titanate. The technique used to grind the lithium titanate is not limited to any particular one, and may be selected from existing techniques as appropriate. Such a technique may be, for example, a technique involving use of a ball mill.

By grinding the lithium titanate into smaller particles, it is possible to increase a percentage of a surface area of the lithium titanate with respect to a total volume of the lithium titanate. This is expected to reduce a period of time required for lithium contained in the lithium titanate to be dissolved in a solution in the later-described hydrochloric acid immersing step S52. Meanwhile, grinding the lithium titanate into excessively small particles increases a period of time and cost taken for the grinding step S51. Therefore, the particle diameter of the lithium titanate to be obtained through the grinding step S51 is preferably determined in consideration of the period of time taken for the hydrochloric acid immersing step S52, the period of time taken for the grinding step S51, the cost taken for the grinding step S51, and/or the like.

The particle diameter of the lithium titanate may be any of an average diameter, a mode diameter, and a median diameter. In a case where a particle diameter distribution of the lithium titanate is obtained, the average diameter is a particle diameter corresponding to an average in the particle diameter distribution thus obtained, the mode diameter is a highest frequency particle diameter in the particle diameter distribution, and the median diameter is a particle diameter corresponding to 50% cumulative frequency in the particle diameter distribution.

In Embodiment 5, the grinding step S51 is carried out so that the average diameter of the lithium titanate is 100 μm.

The hydrochloric acid immersing step S52 is a step that is to be carried out after the grinding step S51. The hydrochloric acid immersing step S52 is a step of immersing, in a hydrochloric acidic solution, the lithium titanate having been ground through the grinding step S51. As a result of the hydrochloric acid immersing step S52, lithium contained in the lithium titanate is dissolved in the hydrochloric acidic solution as lithium chloride, and titanium contained in the lithium titanate remains in the hydrochloric acidic solution as titanium oxide (e.g., $TiO_2$). Thus, the hydrochloric acidic solution that has undergone the hydrochloric acid immersing step S52 includes the titanium oxide contained in the solid phase and the lithium chloride contained in the liquid phase.

In order to dissolve, in the hydrochloric acidic solution, lithium contained in the lithium titanate more quickly, a method similar to the main heating step S12 may be employed to dielectrically heat the hydrochloric acidic solution containing the lithium titanate.

The third filtering step S53 is a step that is to be carried out after the hydrochloric acid immersing step S52. The third filtering step S53 is a step of separating, with use of a filter, the titanium oxide contained in the solid phase and the lithium chloride contained in the liquid phase from each other.

By carrying out the third filtering step S53, it is possible to easily separate the titanium oxide contained in the solid phase and the lithium chloride contained in the liquid phase from each other.

Similarly to the acidic solution separated in the first filtering step S13, the acidic solution containing the lithium chloride separated in the first filtering step S53 is preferably subjected again to the sodium hydroxide adding step S14. By separating, as lithium chloride, lithium contained in the solid phase separated through the first filtering step S13 and subjecting the lithium chloride again to the sodium hydroxide adding step S14, it is possible to collect a lithium compound more efficiently. In other words, the grinding step S51, the hydrochloric acid immersing step S52, and the third filtering step S53 of the separating method M50 can be included as a part of the production method M10.

As described above, by carrying out the separating method M50, it is possible to isolate titanium and lithium contained in the lithium titanate as titanium oxide and lithium chloride, respectively. Thus, lithium, which is a precious resource, can be collected together with titanium for reuse.

Embodiment 6

(Method M60 for Producing Lithium Solution)

The following description will discuss a method M60 for producing a lithium solution in accordance with Embodiment 6 of the present invention with reference to FIG. 4. FIG. 4 shows a flowchart of the method M60 for producing a lithium solution. Hereinafter, the method M60 for producing the lithium solution may also simply be referred to as a production method M60. The description in Embodiment 6 will discuss a method for producing a LiCl solution, which is an aqueous solution of the lithium chloride (LiCl) that is hydrochloride of lithium. However, the lithium solution to be produced by the production method M60 is not limited to the LiCl solution, but may be a $Li_2SO_4$ solution, a $LiNO_3$ solution, lithium fluoride (LiF), lithium bromide (LiBr), or lithium iodide (LiI). The $Li_2SO_4$ solution is an aqueous solution of lithium sulfate ($Li_2SO_4$), which is a sulfate of lithium. The $LiNO_3$ solution is an aqueous solution of the lithium nitrate ($LiNO_3$), which is nitrate of lithium. Lithium fluoride (LiF) is the hydrofluoric acid salt of lithium. Lithium bromide (LiBr) is hydrobromide of lithium. Lithium iodide (LiI) is a hydroiodide of lithium.

As shown in FIG. 4, the production method M60 includes a grinding step S61, a pre-heating step S62, a main heating step S63, a first impurity removing step S64, and a second impurity removing step S65. In the production method M60, a lithium ore is used as a starting material from which a lithium solution is to be produced. The lithium ore is a generic term for ores containing lithium, and is an example of the lithium oxide. The lithium ore has crystallinity. Examples of the lithium ore encompass lepidolite ($K(Al,Li)_2(Si,Al)_4O_{10}(OH,F)_2$), petalite ($LiAlSi_4O_{10}$), and elbaite ($Na(Li,Al)_3Al_6(BO_3)_3Si_6O_{18}(OH)_4$). The following description in Embodiment 6 will discuss the production method M60 by taking lepidolite as an example of the starting material.

The grinding step S61 is a step of grinding a block of lepidolite into particles. The technique used to grind lepidolite is not limited to any particular one, and may be selected from existing techniques as appropriate. Such a technique may be, for example, a technique involving use of a hammer or a ball mill. Alternatively, the technique used to grind lepidolite may be a combination of two or more techniques (e.g., a hammer and a ball mill). In this case, the hammer may be used at a first stage in the grinding step S61, and the ball mill may be used at a second stage in the grinding step S61.

By grinding lepidolite into smaller particles, it is possible to increase a percentage of a surface area of lepidolite with respect to a total volume of lepidolite. This is expected to reduce a period of time required for lithium contained in lepidolite to be dissolved in a solution in each of the pre-heating step S62 and the main heating step S63, which will be described later. Meanwhile, grinding lepidolite into excessively small particles increases a period of time and cost taken for the grinding step S61. Therefore, the particle diameter of lepidolite to be obtained through the grinding step S61 is preferably determined in consideration of the period of time taken for the pre-heating step S62 and the main heating step S63, the period of time taken for the grinding step S61, the cost taken for the grinding step S61, and/or the like.

The particle diameter of lepidolite may be any of an average diameter, a mode diameter, and a median diameter. In a case where a particle diameter distribution of lepidolite is obtained, the average diameter is a particle diameter corresponding to an average in the particle diameter distribution thus obtained, the mode diameter is a highest frequency particle diameter in the particle diameter distribution, and the median diameter is a particle diameter corresponding to 50% cumulative frequency in the particle diameter distribution.

In Embodiment 6, the grinding step S61 is carried out so that the average diameter of lepidolite is 100 μm.

(Pre-Heating Step S62)

The pre-heating step S62 is a step that is to be carried out before the later-described main heating step S63 and that dielectrically heats a basic solution containing lepidolite. The basic solution is not limited to any particular one, and may be an aqueous solution of sodium hydroxide (NaOH) or an aqueous solution of potassium hydroxide (KOH), each of which is a basic solute. In Embodiment 6, a NaOH solution is used as the basic solution. The concentration of NaOH in the NaOH solution can be adjusted as appropriate. Preferably, this concentration is adjusted to have a pH of not less than 14.

The dielectric heating is a generic term for techniques for applying, to a target object, an electromagnetic wave having a given frequency so as to heat the target object. According to the band of the electromagnetic wave to be applied, the dielectric heating is called radio-frequency heating or microwave heating. For example, the radio-frequency heating applies, to the target object, an electromagnetic wave (a so-called short wave or an ultrashort wave) within a band of not less than 3 MHz and less than 300 MHz, whereas the microwave heating applies, to the target object, an electromagnetic wave (a so-called microwave) within a band of not less than 300 MHz and less than 30 GHz. A microwave oven, which is widely used also in home, is an example of a device that can carry out the microwave heating.

In Embodiment 6, the pre-heating step S62 applies, to the NaOH solution containing lepidolite, an electromagnetic wave having a frequency of 2.45 GHz. A configuration of a device that applies an electromagnetic wave to the NaOH solution containing lepidolite will be described later with reference to FIGS. 5 and 7.

Carrying out the pre-heating step S62 before the main heating step S63 forms plural reaction parts, e.g., corrosion, dissolution, collapse, and/or the like, in some parts of the surface texture of the surface of lepidolite. The shape of each reaction part is not limited to any particular one. For example, the shape of the reaction part may be a recess. As compared to the surface of lepidolite having not been subjected to the main heating step S63 yet, the surface of lepidolite in which the plural reaction parts are formed are fragile. Thus, by carrying out the later-described main heating step S63 on lepidolite having been subjected to the pre-heating step S62, lepidolite can easily be dissolved in an acidic solution. As discussed above, with the production method M60 including the pre-heating step S62, it is possible to dissolve a lithium ore, which is difficult to be dissolved when being subjected to the main heating step S63 alone. Therefore, the production method M60 including the pre-heating step S62 can produce a lithium chloride solution from a starting material that is selectable not only from lithium ores that are relatively easy to be dissolved in an acidic solution, but also from lithium ores that are difficult to be dissolved in an acidic solution.

It is possible to appropriately determine whether to omit the pre-heating step S62 in the production method M60, according to the degree of easiness of dissolution of the lithium ore, which is used as the starting material, in the acidic solution.

(Main Heating Step S63)

The main heating step S63 is a step that is to be carried out after the pre-heating step S62 and that dielectrically heats the acidic solution containing lepidolite so as to generate a lithium solution, which is an acidic solution containing lithium dissolved therein.

The acidic solution is not limited to any particular one. The aqueous solution can be an aqueous solution of any of hydrogen chloride (HCl), sulfuric acid ($H_2SO_4$), nitric acid ($HNO_3$), hydrogen fluoride (HF), hydrogen bromide (HBr), and hydrogen iodide (HI), each of which is an acidic solute. In Embodiment 6, an HCl solution is used as the acidic solution. The concentration of HCl in the HCl solution can be adjusted as appropriate. Preferably, the concentration of HCl in the HCl solution is adjusted to have a pH of not more than 1.

By adding an appropriate amount of HCl solution to the NaOH solution that has undergone the pre-heating step S62, the basic solution containing lithium is turned, through neutrality, into an acidic solution containing lithium.

The dielectric heating carried out in the main heating step S63 is similar to that carried out in the pre-heating step S62. That is, in Embodiment 6, the pre-heating step applies, to the HCl solution containing the lithium ore, an electromagnetic wave having a frequency of 2.45 GHz.

By heating the acidic solution containing the lithium oxide through the dielectric heating, it is possible to dissolve lithium oxide in the acidic solution with higher energy efficiency than conventional. Specifically, it is possible to yield a hydrochloric acidic solution in which lithium chloride (LiCl) is dissolved. Thus, the production method M60 can be provided as a novel production method with high energy efficiency.

A heating temperature in the main heating step S63 can be set as appropriate in a similar manner to that in the main heating step S12. That is, in a case where a container (e.g., the main heating container 14 described in Embodiment 7) storing the acidic solution containing the lithium oxide is made of polytetrafluoroethylene, the heating temperature in the main heating step S63 is preferably not higher than 250° C. The heating temperature in the main heating step S63 is preferably not lower than 180° C. A heating time in the main heating step S63 can also be set as appropriate. Preferably, the heating time is not less than 60 minutes, for example.

(First Impurity Removing Step S64)

The first impurity removing step S64 is a step that is to be carried out after the main heating step S63. The first impurity removing step S64 is a step of removing, with use of an organic compound that adsorbs a first element, the first element from the LiCl solution obtained through the main heating step S63.

The first element to be removed in the first impurity removing step S64 varies depending on the organic compound used here. Examples of the organic compound that can be used in the first impurity removing step S64 encompass tri-n-octylphosphine oxide (TOPO), di-(2-ethylhexyl) phosphoric acid (D2EHPA), tri-n-butyl phosphate (TBP), and ethylenediaminetetraacetic acid (EDTA). Examples of a commercially-available organic compound that can be used in the first impurity removing step S64 encompass UTEVA (registered trademark) resin available from Eichrom Technologies (registered trademark).

TOPO can adsorb Al, Au, Co, Cr, Fe, Hf, Re, Ti, $UO_2^{2+}$, V, Zr, rare earth elements, and actinoid elements. D2EHPA can adsorb U, Co, Ni, Mn, and the like. TBP can adsorb U, Th, and the like. EDTA and similar ones can adsorb Mg, Ca, Ba, Cu, Zn, Al, Mn, Fe, and the like. UTEVA (registered trademark) resin can adsorb U, Th, Pu, Am, and the like. These elements are examples of the first element.

The organic compound(s) can be dissolved in an organic solvent (e.g., kerosene). The HCl solution that has undergone the main heating step S63 is mixed with the solution in which any of these organic compounds is dissolved (hereinafter, such a solution may also be referred to as an organic compound solution), and a resultant is stirred. Consequently, the organic compound adsorbs the first element.

A mixture of the LiCl solution, which is an aqueous solution, obtained through the main heating step S63 and the organic compound solution is separated into two layers after being left for a while. Thus, the LiCl solution in which the content of the first element has been reduced as a result of the first impurity removing step S64 and the organic solvent containing the first element can easily be separated from each other.

By carrying out the first impurity removing step S64, it is possible to reduce the concentration of the first element in the lithium solution. Consequently, even in a case where, in a process for dissolving a lithium ore in an acidic solution so as to produce a lithium solution, the lithium ore contains a first element that is an element other than lithium such as those described above, it is possible to reduce the concentration of the first element contained in the lithium solution used to produce any of lithium, lithium hydroxide, lithium oxide, and lithium carbonate. Examples of the first element encompass uranium, thorium, plutonium, and americium.

(Second Impurity Removing Step S65)

The second impurity removing step S65, which is further included, is a step that is to be carried out after the main heating step S63 and that adjusts the polarity of the LiCl solution from acidity to neutrality, and then to basicity so as to remove a second element from the LiCl solution, the LiCl solution having been obtained through the main heating step S63. In the description in Embodiment 6, the first impurity removing step S64 and the second impurity removing step S65 are carried out in this order after the main heating step S63. Alternatively, the order of the first impurity removing step S64 and the second impurity removing step S65 can be changed.

In Embodiment 6, the second impurity removing step S65 adds, to the lithium solution that has undergone the main heating step S63 (an HCl solution containing lithium), a basic compound or a basic aqueous solution containing a basic compound dissolved therein. One example of the basic compound is sodium bicarbonate ($NaHCO_3$), whereas one example of the basic aqueous solution is an aqueous sodium hydroxide (NaOH) solution. In Embodiment 6, the aqueous sodium hydroxide solution is used as the basic aqueous solution.

As a result of the second impurity removing step S65, the polarity of the lithium solution is changed from acidity to neutrality (pH 7), and then to basicity. Along with the change in polarity, the element(s) (e.g., Al and/or Fe) being contained in the lithium solution and being other than lithium is/are precipitated as hydroxide(s) (e.g., $Al(OH)_3$ and/or $Fe(OH)_3$) in the lithium solution. Even in a state in which an excessive amount of sodium hydroxide is added or sodium bicarbonate is saturated, LiOH is dissolved in the lithium solution and would not be precipitated. As described above, aluminum (Al) and iron (Fe) are examples of the second element.

The hydroxide(s) of the element(s) other than lithium precipitated in the lithium solution as a result of the second impurity removing step S65 can easily be removed from the lithium solution by filtering the lithium solution.

It is preferable to add HCl again to the lithium solution from which the second element has been removed as a result of the second impurity removing step S65. By adding HCl again to the lithium solution, the polarity of the LiOH solution is adjusted to neutrality, and then to acidity. Consequently, in the solution, highly pure beryllium lithium chloride (LiCl) is generated.

By carrying out the second impurity removing step S65, it is possible to reduce the concentration of the second element in the lithium solution. Consequently, even in a case where, in a process for dissolving a lithium ore in an acidic solution so as to produce a lithium solution, the lithium ore contains a second element that is an element other than lithium such as those described above, it is possible to reduce the concentration of the second element in the lithium solution used to produce any of lithium, lithium hydroxide, lithium oxide, and lithium carbonate.

As described above, in the production method M60, it is preferable that (a) the pre-heating step S62 dielectrically heat the basic solution containing lithium oxide by applying a microwave to the basic solution and (b) the main heating step S63 dielectrically heat the acidic solution containing lithium oxide by applying a microwave to the acidic solution.

The technique of the dielectric heating involving use of a microwave (i.e., microwave dielectric heating) is a technique used for so-called microwave ovens, that is, a widely-used technique. Thus, the production method M60 can reduce the cost required to carry out the production method M60, as compared to conventional production methods.

As described above, in the production method M60, the lithium solution is preferably a lithium chloride solution.

With the production method M60, it is possible to easily produce the lithium chloride solution. From the lithium chloride solution, it is possible to easily produce lithium, lithium hydroxide, lithium oxide, and lithium carbonate, as will be described later. Therefore, the lithium chloride solution is suitable as the lithium solution.

(Variations of Starting Material)

The description in Embodiment 6 has dealt with the method M60 for producing the lithium solution, the method using a lithium ore (more specifically, lepidolite) as a starting material. However, the starting material used in the production method M60 is not limited to the lithium ore. Alternatively, the starting material may be a beryllium ore. Further alternatively, the starting material may be an ore or mud containing one or more kinds of metals.

It is known that the beryllium ores are ores containing beryllium and are classified into Be—Si—O ores and Be—Si—Al—O ores. Examples of the Be—Si—O ore encompass bertrandite and phenacite. Examples of the Be—Si—

Al—O ore encompass beryl and chrysoberyl. In a case where the Be—Si—O ore is used, it is possible to easily dissolve beryllium in an acidic solution merely by carrying out the main heating step S63 without carrying out the pre-heating step S62. Meanwhile, in a case where the Be—Si—Al—O ore is used, it is possible to easily dissolve beryllium in an acidic solution by carrying out the pre-heating step S62 and the main heating step S63.

The ore containing one or more kinds of metals is called a polymetallic nodule. As examples of the polymetallic nodule, a submarine hydrothermal deposit, a cobalt-rich crust, and a manganese nodule are known.

The submarine hydrothermal deposits encompass, in addition to base metals such as copper, lead, and zinc, noble metals such as gold and silver and rare metals. The cobalt-rich crusts encompass rare metals such as nickel, cobalt, and platinum. The manganese nodules encompass base metals such as copper and rare metals such as nickel and cobalt.

As an example of the mud containing one or more kinds of metals, rare-earth mud containing a rare-earth element is known.

By carrying out the production method M60 involving use of any of these starting materials, it is possible to produce, from the starting material containing various metals, a solution containing the metals dissolved therein.

Embodiment 7

The following description will discuss a dielectric heating device 10 in accordance with Embodiment 7 of the present invention with reference to FIG. 5. The dielectric heating device 10 is an example of a beryllium solution production device in accordance with an aspect of the present invention. FIG. 5 is a view schematically illustrating the dielectric heating device 10. The dielectric heating device 10 is a heating device that carries out the main heating step S12 included in the production method M10 shown in FIG. 1, the main heating step S12 included in the separating method M50 shown in FIG. 3, the pre-heating step S62 included in the production method M60 shown in FIG. 4, and the main heating step S63 included in the production method M60 shown in FIG. 4.

As described in Embodiment 1, the dielectric heating is classified into the radio-frequency heating or the microwave heating depending on the band of an electromagnetic wave to be applied. The dielectric heating device 10 is a device that carries out, among the radio-frequency heating and the microwave heating, the microwave heating with respect to a target object.

As shown in FIG. 5, the dielectric heating device 10 includes a microwave oscillator 11, a waveguide 12, a microwave applying section 13, a main heating container 14, a rotary table 15, a stirrer 16, and a thermometer 17. The dielectric heating device 10 further includes a control section, which is not illustrated in FIG. 5.

The microwave oscillator 11 is configured to oscillate an electromagnetic wave having a given frequency. The given frequency can be selected as appropriate within the band of a microwave. In Embodiment 7, the given frequency is 2.45 GHz. The frequency of 2.45 GHz is identical to that of an electromagnetic wave used in microwave ovens for home use.

The waveguide 12 is a metal tubular member having a first end connected with the microwave oscillator 11 and a second end connected with the microwave applying section 13. The waveguide 12 guides, from the first end to the second end, an electromagnetic wave oscillated by the microwave oscillator 11. Then, the waveguide 12 discharges the electromagnetic wave into an internal space of the microwave applying section 13 through the second end.

The microwave applying section 13 is a metal box-shaped member being hollow and having an internal space in which the main heating container 14 can be accommodated. The microwave applying section 13 applies, to the main heating container 14 and a target object to be heated (i.e., a heating target object) that is stored in the main heating container 14, the electromagnetic wave emitted from the second end of the waveguide 12. The microwave applying section 13 is configured to confine an electromagnetic wave in the internal space so that the electromagnetic wave hardly leaks to the outside.

Although not shown in FIG. 5, the main heating container 14 is constituted by a main body and a lid. The main body is constituted by a tubular side wall and a bottom with which a first end of the side wall is sealed. The main heating container 14, which is constituted by the main body and the lid coupled to each other, is configured to be capable of sealing the internal space defined by the main body and the lid.

The main heating container 14 is preferably made of a material having a high transmittance for an electromagnetic wave (in Embodiment 7, an electromagnetic wave of 2.45 GHz) to be oscillated by the microwave oscillator 11. In Embodiment 7, the main heating container 14 is made of a fluorine-based resin, such as polytetrafluoroethylene.

The main heating container 14 preferably has pressure resistance with which the main heating container 14 can withstand a pressure in its internal space even if the pressure in the internal space is greater than an atmospheric pressure. Since the main heating container 14 has (i) the internal space that can be sealed and (ii) the pressure resistance with which the main heating container can withstand a given pressure, the main heating container 14 can keep a heating target object in the internal space even if the temperature of the heating target object stored in the internal space increases in response to an electromagnetic wave applied thereto.

The rotary table 15 is a sample table provided on a bottom plane of the internal space of the microwave applying section 13, and has an upper surface on which the main heating container 14 can be placed. The rotary table 15 has a circular shape in a plan view, and is configured to be rotatable, at a given speed, about a center axis of the circular shape as a rotation axis. With this configuration, the main heating container 14 placed on the upper surface of the rotary table 15 rotates at a given speed. This can heat the target object more uniformly.

The stirrer 16 is a metal blade member provided to a ceiling plane of the internal space of the microwave applying section 13. The blade member has a center coupled to a supporting rod, with which the blade member is rotatably fixed to the ceiling plane. The stirrer 16 rotates about the supporting rod as a rotation axis at a given speed, thereby reflecting an electromagnetic wave oscillated by the microwave oscillator 11. Consequently, the electromagnetic wave is scattered into the internal space of the microwave applying section 13. With this configuration, the stirrer 16 scatters the electromagnetic wave. This can heat the target object more uniformly.

The thermometer 17 is a radiation thermometer that detects an infrared ray from the main heating container 14 to measure the temperature of the container 14. After the lapse of a given temperature moderating time, the temperature of the main heating container 14 becomes almost equal to that of the target object stored in the internal space of the main heating container 14. The temperature moderating time depends on the material (in Embodiment 7, a fluorine-based resin) from which the main heating container 14 is made and the thickness (e.g., 1 mm) of the main heating container 14. In a case where the main heating container 14 being made of the fluorine-based resin and having a thickness of 1 mm is employed as in Embodiment 7, the temperature moderating time is assumed to be approximately three minutes. Thus, in a case where the heating time is sufficiently longer than the temperature moderating time and/or in a case a change in temperature of the target object stored in the internal space of the main heating container 14 is sufficiently moderate, the temperature of the target object stored in the internal space of the main heating container 14 can be considered as being equal to the temperature of the main heating container 14. Thus, in such a case, the thermometer 17 can determine that the temperature of the target object is measurable. The thermometer 17 outputs, to the control section, a temperature signal indicative of the measured temperature of the main heating container 14 or the target object.

The control section may control an output from the microwave oscillator 11 so that the output becomes a given value or so that the temperature indicated by the temperature signal received from the thermometer 17 becomes a predetermined temperature. The predetermined temperature may be constant or may be changed over time. In Embodiment 7, the control section controls an output from the microwave oscillator 11 so as to change the value of the output over time. One example of the value of the output that is changed over time may be a pattern according to which the value of the output is changed from 0 W to 600 W in 30 minutes and then is maintained at 600 W for 60 minutes.

Here, the production method M10 is taken as an example. Then, by storing, in the internal space of the main heating container 14 of the dielectric heating device 10 configured as above, the starting material taken out from the blanket in the starting-material taking-out step S11 and the acidic solution, it is possible to carry out the main heating step S12.

Meanwhile, the production method M60 is taken as an example. Then, by storing, in the internal space of the main heating container 14 of the dielectric heating device 10 configured as above, lepidolite ground in the grinding step S61 and the basic solution, it is possible to carry out the pre-heating step S62. Similarly, by storing, in the internal space of the main heating container 14 of the dielectric heating device 10 configured as above, lepidolite having been subjected to the pre-heating step S62 and the acidic solution, it is possible to carry out the main heating step S63.

FIG. 6 is a graph showing a change in temperature of the container in the above-described example of the main heating step S12. In this example, the value of the output from the dielectric heating device 10 was changed over time. Specifically, the value of the output was changed from 0 W to 600 W in 30 minutes and then was maintained at 600 W for 60 minutes. Thereafter, the value of the output was quickly decreased to 0 W.

In a case where the value of the output from the microwave oscillator 11 was changed according to the above-described pattern, the temperature of the main heating container 14 kept increasing even after the value of the output reached 600 W, and the maximum temperature was approximately 220° C. as shown in FIG. 6.

Embodiment 8

(Beryllium Production System)

The following description will discuss a beryllium production system 20 in accordance with Embodiment 8 of the present invention with reference to FIGS. 7 and 8. FIG. 7 is a view schematically illustrating a beryllium solution ($BeCl_2$ solution) production device 20A constituting a part of the beryllium production system 20. (a) of FIG. 8 is a view schematically illustrating a crystallizer 20B, an anhydrization device 20C, and an electrolyzing device 20D. (b) of FIG. 8 is a view schematically illustrating a variation of a crystallization treatment tank 31 included in the crystallizer 20B shown in (a) of FIG. 8. (c) of FIG. 8 is a view schematically illustrating a variation of a dryer 33 included in the anhydrization device 20C shown in (a) of FIG. 8. Each of the crystallizer 20B, the anhydrization device 20C, and the electrolyzing device 20D constitutes a part of the beryllium production system 20. Hereinafter, the beryllium production system 20 may also simply be referred to as a production system 20, and the beryllium solution production device 20A may also simply be referred to as a production device 20A.

As shown in FIGS. 7 and 8, the production system 20 is a device that includes the production device 20A, the crystallizer 20B, the anhydrization device 20C, and the electrolyzing device 20D and that is configured to carry out the production method M20 shown in FIG. 2. More specifically, the production device 20A is a device that is configured to execute the steps of the production method M10 shown in FIG. 1 except for the taking-out step S11. The crystallizer 20B and the anhydrization device 20C are devices configured to execute the anhydrization step S21 shown in FIG. 2. The electrolyzing device 20D is a device configured to execute the electrolyzing step S22 shown in FIG. 2.

Similarly to Embodiment 1, Embodiment 8 employs, as the starting material, lithium titanate ($Li_2TiO_3$), which is one example of the tritium breeder material, and also employs beryllium, which is one example of the neutron multiplying material, having a surface on which an oxidized layer made of beryllium oxide (BeO) is formed. The starting material in the production device 20A is not limited to the starting materials indicated as examples in Embodiment 1. The starting material in the production device 20A may be a beryllium ore, for example. The beryllium ore is a generic term for ores containing beryllium. As the beryllium ores, a Be—Si—O ore and a Be—Si—Al—O ore are known. Examples of the Be—Si—O ore encompass bertrandite and phenacite. Examples of the Be—Si—Al—O ore encompass beryl and chrysoberyl.

<Beryllium Solution Production Device 20A>

As shown in FIG. 7, the production device 20A includes a grinder 21, a feeder F1, valves V1 to V15, a dielectric heating device 22, filters 23 and 29, containers 24, 26, 27, 28, and 30, and a centrifuge 25. The production device 20A further includes a control section, which is not illustrated in FIG. 7. The control section controls the feeder F1, the valves V1 to V15, and the dielectric heating device 22.

The grinder 21 grinds lithium titanate and beryllium having a surface on which an oxidized layer is formed, the lithium titanate and beryllium being the starting material charged thereto. Then, the grinder 21 supplies a resultant to the feeder F1. The grinder 21 can be selected as appropriate from existing grinders according to a desired specification. Thus, a detailed description of the grinder 21 is omitted here. With the configuration in which the grinder 21 grinds the starting material, even in a case where beryllium, which is one example of the neutron multiplying material, has a surface on which an oxidized layer is formed, it is possible to mechanically break the oxidized layer so that beryllium having been covered with the oxidized layer is exposed. Thus, it is possible to increase the rate at which beryllium is dissolved in the HCl solution in the main heating step S12. Note that, in a case where beryllium can easily be dissolved by the later-described dielectric heating device 22 (e.g., in a case where the oxidized layer formed on beryllium is thin), the grinder 21 can be omitted.

The feeder F1, which is controlled by the control section, supplies, to the main heating container 22c of the dielectric heating device 22 (described later), the starting material supplied from the grinder 21. The feeder F1 is one example of the raw material supplying section configured to supply the starting material to the main heating container 22c.

The dielectric heating device 22 includes a microwave oscillator 22a, a waveguide 22b, the main heating container 22c, a stirring mechanism, and a thermometer. The dielectric heating device 22 carries out the main heating step S12 of the production method M10 shown in FIG. 1.

The microwave oscillator 22a, which is one example of the main heating device, is controlled by the control section, and is configured to oscillate an electromagnetic wave having a given frequency. The given frequency can be selected as appropriate within the band of a microwave. In Embodiment 8, the given frequency is 2.45 GHz. The frequency of 2.45 GHz is identical to that of an electromagnetic wave used in microwave ovens for home use.

The waveguide 22b is a metal tubular member having a first end connected with the microwave oscillator 22a and a second end connected with the main heating container 22c. The waveguide 22b guides, from the first end to the second end, an electromagnetic wave oscillated by the microwave oscillator 22a. Then, the waveguide 22b discharges the electromagnetic wave into an internal space of the main heating container 22c through the second end.

The main heating container 22c is a box-shaped member that is hollow, that has a sealed internal space, and that has acid resistance. The main heating container 22c receives the starting material supplied thereto from the grinder 21 via the feeder F1, and receives the HCl solution via the valve V1. The mechanism that supplies the HCl solution to the main heating container 22c via the valve V1 functions as an acidic solution supplying section that supplies an acidic solution to the starting material. The starting material and the HCl solution supplied to the main heating container 22c are mixed in the internal space of the main heating container 22c.

The main heating container 22c preferably has pressure resistance with which the main heating container 22c can withstand pressure in the internal space which pressure is increased so as to be higher than atmospheric pressure due to increase in temperature of the HCl solution containing the starting material stored in the internal space as a result of dielectric heating. Since the main heating container 22c has (i) the internal space that can be sealed and (ii) the pressure resistance with which the main heating container 22c can withstand a given pressure, the main heating container 22c can keep a heating target object in the internal space even if the temperature of the heating target object stored in the internal space increases in response to an electromagnetic wave applied thereto.

The stirring mechanism (not illustrated in FIG. 7) stirs the starting material and the HCl solution so that the starting material is dispersed as uniformly as possible in the HCl solution in the internal space of the main heating container 22c.

The thermometer (not illustrated in FIG. 7) detects the temperature of the HCl solution containing the starting material stored in the internal space of the main heating container 22c, and outputs a temperature signal indicative of the temperature to the control section. The thermometer may be a noncontact-type thermometer such as a radiation thermometer or a contact-type thermometer such as a thermocouple. Either in a case of employing the noncontact-type thermometer or a case of employing the contact-type thermometer, the thermometer is preferably provided in the internal space of the main heating container 22c and is preferably configured to be capable of directly detecting the temperature of the HCl solution containing the starting material.

The control section may control an output from the microwave oscillator 22a so that the output becomes a given value or so that the temperature indicated by the temperature signal received from the thermometer becomes a predetermined temperature. The predetermined temperature may be constant or may be changed over time. In Embodiment 8, the control section controls an output from the microwave oscillator 22a so as to change the temperature indicated by the temperature signal over time according to a given profile. One example of the given profile of the temperature may be a pattern according to which the temperature is changed from room temperature to 250° C. in 30 minutes and then is maintained at 250° C. for 60 minutes.

The dielectric heating device 22 configured as above carries out the main heating step S12 of the production method M10 shown in FIG. 1 so as to generate a beryllium solution ($BeCl_2$ solution) containing titanium oxide that is a solid phase and lithium that is a liquid phase.

In Embodiment 8, the pre-heating step that can be carried out between the taking-out step S11 and the main heating step S12 of the production method M10 is omitted. Therefore, the production device 20A includes only the dielectric heating device 22 for carrying out the main heating step S12, and does not include the dielectric heating device for carrying out the pre-heating step. In a case where the production method M10 includes the pre-heating step, an additional dielectric heating device, configured similarly to the dielectric heating device 22, for carrying out the pre-heating step may be disposed between the feeder F1 and the dielectric heating device 22.

The dielectric heating device that carries out the pre-heating step may include: a pre-heating container; a basic solution supplying section (a valve corresponding to the valve V1) configured to supply a basic solution (e.g., a NaOH solution) to the pre-heating container; a raw material supplying section configured to supply the starting material to at least one (in Embodiment 8, the pre-heating container) of the pre-heating container and the basic solution supplying section; a pre-heating device configured to dielectrically heat the basic solution stored in the pre-heating container; and a discharging section configured to discharge the basic solution containing the starting material from the pre-heating container to the main heating container.

In the production device 20A, it is possible to appropriately determine whether to provide the dielectric heating device for carrying out the pre-heating step, according to the degree of easiness of dissolution of the starting material in the acidic solution. Here, assume a case of the beryllium ore as an example. Phenacite and bertrandite are easy to be dissolved in an acidic solution, whereas beryl and chrysoberyl are difficult to be dissolved in an acidic solution. Thus, in a case where phenacite and bertrandite are used as the starting material, the production device 20A may omit the dielectric heating device for carrying out the pre-heating step. Meanwhile, in a case where beryl and chrysoberyl are used as the starting material, the production device 20A preferably includes the dielectric heating device for carrying out the pre-heating step.

The valve V2 opens and closes a passage between the internal space of the main heating container 22c and the later-described filter 23. The control section closes the valve V2 while the main heating step S12 is being carried out, and opens the valve V2 after the main heating step S12 ends. Consequently, the beryllium solution containing lithium obtained as a result of the main heating step S12 is supplied from the main heating container 22c to the filter 23.

The filter 23 is configured to allow the liquid phase (i.e., the $BeCl_2$ solution containing LiCl) of the beryllium solution containing lithium to pass therethrough and to catch the solid phase (i.e., titanium oxide) of the beryllium solution containing lithium. That is, the filter 23 carries out the first filtering step S13 of the production method M10. The filter 23 can be selected as appropriate from existing filters according to a desired specification. Thus, a detailed description of the filter 23 is omitted here.

The valve V3 opens and closes a passage between the filter 23 and the later-described container 24. The control section opens the valve V3 at least during a period in which the beryllium solution containing lithium is being supplied to the filter 23. Consequently, the $BeCl_2$ solution containing LiCl obtained as a result of the first filtering step S13 is supplied from the filter 23 to the container 24.

The container 24 is a box-shaped member that is hollow, that has a sealed internal space, and that has acid resistance. The later-described containers 26, 27, 28, and 30 are each configured as a box-shaped member having acid resistance. The container 24 is supplied with a NaOH solution via the valve V4. The mechanism that supplies the NaOH solution to the beryllium solution in the container 24 via the valve V4 functions as a NaOH solution supplying section that supplies the NaOH solution to the beryllium solution.

The $BeCl_2$ solution containing LiCl and the NaOH solution having been supplied to the container 24 are mixed together in the internal space of the container 24. That is, in the internal space of the container 24, the sodium hydroxide adding step S14 of the production method M10 is carried out. Consequently, in the container 24, beryllium hydroxide ($Be(OH)_2$) that is a solid phase is generated, and LiOH that is a liquid phase is dissolved in the NaOH solution.

Although not shown in FIG. 7, a stirring mechanism for stirring the $BeCl_2$ solution containing LiCl and the NaOH solution may be provided in the internal space of the container 24. Similarly, stirring mechanisms may be provided in the internal spaces of the later-described containers 26, 27, 28, and 30, respectively.

The valve V5 opens and closes a passage between the internal space of the container 24 and the later-described centrifuge 25. The control section closes the valve V5 while the sodium hydroxide adding step S14 is being carried out, and opens the valve V5 after the sodium hydroxide adding step S14 ends. Consequently, the NaOH solution containing $Be(OH)_2$ and LiOH obtained as a result of the sodium hydroxide adding step S14 is supplied from the container 24 to the centrifuge 25.

The centrifuge 25 separates the liquid phase (i.e., the NaOH solution containing LiOH) and the solid phase (i.e., $Be(OH)_2$) from each other in the NaOH solution containing $Be(OH)_2$ and LiOH. That is, the centrifuge 25 carries out the second filtering step S15 of the production method M10. The centrifuge 25 can be selected as appropriate from existing centrifuges according to a desired specification. Thus, a detailed description of the centrifuge 25 is omitted here. $Be(OH)_2$ obtained as a result of the second filtering step S15 is charged into the internal space of the later-described container 26, and the aqueous NaOH solution containing LiOH obtained as a result of the second filtering step S15 is collected into a collection line (not illustrated).

In order to separate the liquid phase and the solid phase from each other in the NaOH solution containing $Be(OH)_2$ and LiOH, a filter such as the filter 23 can be used instead of the centrifuge 25.

The container 26 is supplied with the HCl solution via the valve V6. $Be(OH)_2$ and the HCl solution supplied to the container 26 are mixed together in the internal space of the container 26. That is, in the internal space of the container 26, the hydrochloric acid adding step S16 of the production method M10 is carried out. Consequently, in the container 26, $BeCl_2$ generated as a result of the mixing is dissolved in the HCl solution to yield a beryllium solution ($BeCl_2$ solution).

The valve V7 opens and closes a passage between the internal space of the container 26 and the internal space of the later-described container 27. The control section closes the valve V7 while the hydrochloric acid adding step S16 is being carried out, and opens the valve V7 after the hydrochloric acid adding step S16 ends. Consequently, the beryllium solution obtained as a result of the hydrochloric acid adding step S16 is supplied from the container 26 to the container 27.

The container 27 is supplied with an organic compound solution via the valve V8. The mechanism that supplies the organic compound solution to the container 27 via the valve V8 functions as an organic compound solution supplying section that supplies the organic compound solution to the beryllium chloride solution. The organic compound solution is the organic compound solution explained in the description of the first impurity removing step S17 of the production method M10. Thus, a description of the organic compound solution is omitted here.

The beryllium solution and the organic compound solution supplied to the container 27 are mixed together in the internal space of the container 27. That is, in the internal space of the container 27, the first impurity removing step S17 is carried out. Consequently, in the container 27, the beryllium solution in which the content of the first element has been reduced and the organic compound solution containing the first element are separated into two layers. Since the specific gravity of the beryllium solution is higher than that of the organic compound solution, the beryllium solution goes under the organic compound solution.

The valve V9 opens and closes a passage between the internal space of the container 27 and the collection line (not illustrated). The valve V10 opens and closes a passage between the internal space of the container 27 and the internal space of the later-described container 28.

The control section closes both the valves V9 and V10 while the first impurity removing step S17 is being carried out. After the first impurity removing step S17 is carried out, the control section first opens only the valve V10. Consequently, the beryllium solution which is obtained as a result of the first impurity removing step S17 and in which the content of the first element has been reduced is supplied from the container 27 to the container 28. Thereafter, the control section closes the valve V10 and opens the valve V9.

Consequently, the organic compound solution which is obtained as a result of the first impurity removing step S17 and which contains the first element is collected into the collection line.

The container 28 is supplied with sodium bicarbonate via the valve V11. The mechanism that supplies the sodium bicarbonate to the container 28 via the valve V11 functions as a sodium bicarbonate supplying section that supplies the sodium bicarbonate to the beryllium chloride solution. The sodium bicarbonate is the sodium bicarbonate in the description of the second impurity removing step S18 of the production method M10. Thus, a description of the sodium bicarbonate is omitted here.

The beryllium solution and the sodium bicarbonate supplied to the container 28 are mixed together in the internal space of the container 28. That is, in the internal space of the container 28, the second impurity removing step S18 is carried out. Consequently, in the container 28, hydroxide of the second element is precipitated and the content of the second element in the beryllium hydroxide ($Be(OH)_2$) solution is reduced.

The valve V12 opens and closes a passage between the internal space of the container 28 and the later-described filter. The control section closes the valve V12 while the second impurity removing step S18 is being carried out, and opens the valve V12 after the second impurity removing step S18 ends. Consequently, the beryllium hydroxide solution that is obtained as a result of the second impurity removing step S18 and that contains hydroxide of the second element is supplied from the container 28 to the filter 29.

The filter 29 is configured to allow the liquid phase (i.e., the beryllium hydroxide solution) of the beryllium hydroxide solution containing hydroxide of the second element to pass therethrough and to catch the solid phase (i.e., hydroxide of the second element) of the beryllium hydroxide solution containing hydroxide. The filter 29 can be selected as appropriate from existing filters according to a desired specification. Thus, a detailed description of the filter 29 is omitted here.

The valve V13 opens and closes a passage between the filter 29 and the later-described container 30. The control section opens the valve V13 at least during a period in which the beryllium hydroxide solution containing the hydroxide of the second element is being supplied to the filter 29. Consequently, the beryllium hydroxide solution which is obtained as a result of the second impurity removing step S18 and in which the content of the second element has been reduced is supplied from the filter 29 to the container 30.

The container 30 is supplied with the beryllium hydroxide solution via the valve V13, and is supplied with the HCl solution via the valve V14. The $Be(OH)_2$ solution and the HCl solution supplied to the container 30 are mixed together in the internal space of the container 30. Consequently, in the container 30, $BeCl_2$ generated as a result of the mixing is dissolved in the HCl solution to yield a beryllium solution ($BeCl_2$ solution).

The valve V15 opens and closes a passage between the container 30 and the later-described crystallization treatment tank 31 of the crystallizer 20B. The control section closes the valve V15 at least during a period in which the HCl solution is being supplied to the container 30, and opens the valve V15 after the $Be(OH)_2$ solution and the HCl solution supplied to the container 30 are mixed sufficiently. Consequently, the beryllium solution ($BeCl_2$ solution) is supplied from the container 30 to the crystallization treatment tank 31.

<Crystallizer 20B>

As shown in FIG. 8, the crystallizer 20B includes the crystallization treatment tank 31, a chiller C, a pump P, a condensation tank, and valves V16 and V17. The crystallizer 20B further includes a control section, which is not illustrated in FIG. 8. The control section controls the crystallization treatment tank 31, the chiller C, the pump P, and the valves V16 and V17.

The crystallization treatment tank 31 includes an inner tank and an outer tank. The outer tank has an internal space to which hot water is to be supplied via the valve V16. The inner tank has an internal space to which the beryllium solution ($BeCl_2$ solution) generated by the production device 20A is to be supplied. The hot water heats the beryllium solution and the HCl solution stored in the inner tank. Use of the hot water is one example of a heating way employing an external heating method.

The chiller C, the condensation tank, and the pump P constitute a reduced pressure dehydration system. The pump P discharges the gas of the internal space of the inner tank. The chiller C cools the gas discharged from the internal space of the inner tank. The condensation tank stores therein condensed water obtained as a result of cooling carried out by the chiller C.

The crystallizer 20B configured as above can crystalize beryllium chloride. The beryllium chloride obtained as a result of crystallization is supplied from the crystallization treatment tank 31 to the later-described centrifuge 32 via the valve V17.

Note that, as shown in (b) of FIG. 8, the crystallization treatment tank 31 may include a microwave oscillator 31a and a waveguide 31b in place of the valve V16 through which the hot water is to be supplied. The microwave oscillator 31a and the waveguide 31b are respectively configured similarly to the microwave oscillator 22a and the waveguide 22b shown in FIG. 7, and are one example of the dielectric heating device.

As described above, the heating way employed in the crystallizer 20B and configured to heat the beryllium solution and the HCl solution may be the external heating method such as that shown in (a) of FIG. 8 or the dielectric heating method such as that shown in Fig. (b) of FIG. 8. From the viewpoint of energy efficiency, it is preferable to employ the dielectric heating method.

<Anhydrization Device 20C>

As shown in FIG. 8, the anhydrization device 20C includes a centrifuge 32 and a dryer 33. The anhydrization device 20C further includes a control section, which is not illustrated in FIG. 8. The control section controls the centrifuge 32 and the dryer 33.

The beryllium chloride obtained as a result of crystallization carried out by the crystallizer 20B is dehydrated by the centrifuge 32. The dehydrated beryllium chloride is subjected to anhydrization with the dryer 33. One example of the dryer 33 can be a hot-air generating mechanism for generating hot air. The beryllium chloride is heated by hot air generated by the hot-air generating mechanism so as to be anhydrous. That is, the crystallizer 20B and the anhydrization device 20C are one example of the anhydrization device recited in the claims, and can carry out the anhydrization step S21 of the production method M20 shown in FIG. 2. The hot air is one example of the heating way employing the external heating method.

Note that the dryer 33 may include a microwave oscillator 33a and a waveguide 33b in place of the hot-air generating mechanism for generating hot air. The microwave oscillator 33a and the waveguide 33b are respectively configured similarly to the microwave oscillator 22a and the waveguide 22b shown in FIG. 7, and are one example of the dielectric heating device.

As described above, the heating way employed in the anhydrization device 20C and configured to heat the beryllium chloride may be the external heating method such as that shown in (a) of FIG. 8 or the dielectric heating method such as that shown in (c) of FIG. 8. From the viewpoint of energy efficiency, it is preferable to employ the dielectric heating method.

<Electrolyzing Device 20D>

As shown in FIG. 8, the electrolyzing device 20D includes an electrolytic furnace 34a, a power source 34b, an anode 34c, a cathode 34d, and a feeder F2. The electrolytic furnace 34a includes a heater, which is not illustrated in FIG. 8. The electrolyzing device 20D further includes a control section, which is not illustrated in FIG. 8. The control section controls the power source 34b, the heater, and the feeder F2.

Into the electrolytic furnace 34a, the anhydrous beryllium chloride generated by the anhydrization device 20C is supplied. Into the electrolytic furnace 34a, sodium chloride (NaCl) is supplied via the feeder F2.

The electrolytic furnace 34a storing the beryllium chloride and the sodium chloride therein is heated by the heater. Consequently, the beryllium chloride and the sodium chloride are melted. A binary bath containing beryllium chloride and sodium chloride thereto may be used as an electrolytic bath. This makes it possible to lower the melting point of the electrolytic bath. A temperature to which the electrolytic furnace 34a is heated can be appropriately set in a range above the melting point of the binary bath. The temperature of the electrolytic furnace 34a may be 350° C., for example.

The anode 34c is an electrode made of carbon, and the cathode 34d is an electrode made of nickel.

In a state where the binary bath is melted, the control section causes an electric current to flow between the anode 34c and the cathode 34d with use of the power source 34b. Consequently, the binary bath is electrolyzed, so that metal beryllium is formed on the surface of the cathode 34d.

In the above-described manner, the electrolyzing device 20D can carry out the electrolyzing step S22 of the production method M20 shown in FIG. 2.

Other Embodiments

The description in Embodiment 8 has dealt with the production system 20 that involves use of the production device 20A, the crystallizer 20B, and the anhydrization device 20C and that is configured to carry out the production method M20.

The scope of the present invention encompasses not only the beryllium production system 20 but also a beryllium hydroxide production system that is configured to carry out the method M30 for producing beryllium hydroxide and a beryllium oxide production system configured to carry out the method M40 for producing beryllium oxide.

The beryllium hydroxide production system includes the production device 20A shown in FIG. 7 and a neutralization device that neutralizes, with a base, a beryllium chloride solution produced by the production device 20A so as to generate beryllium hydroxide. The neutralization device can be constituted by members respectively corresponding to the container 24, the valves V4 and V5, and the centrifuge 25 shown in FIG. 7, for example. The base used for neutralization may be ammonium, rather than sodium hydroxide.

The beryllium oxide production system includes the production device 20A shown in FIG. 7 and a third heating device that heats a beryllium chloride solution produced by the production device 20A so as to generate beryllium oxide. The third heating device is not limited to any particular one, but may be an electric furnace, for example.

Embodiments 9 and 10

With reference to FIG. 9, the following will discuss a method M70 for producing lithium hydroxide (LiOH) in accordance with Embodiment 9 of the present invention and a method for producing lithium carbonate ($Li_2CO_3$) in accordance with Embodiment 10 of the present invention. (a) and (b) of FIG. 9 respectively show a flowchart of the method M70 for producing lithium hydroxide and a flowchart of the method M80 for producing lithium carbonate.

Each of the method M70 for producing lithium hydroxide and the method M80 for producing lithium carbonate uses the solution that is obtained as the liquid phase through the second filtering step S15 and that contains the lithium hydroxide. According to a priority at that time, it is possible to appropriately determine whether the method M70 for producing lithium hydroxide or the method M80 for producing lithium carbonate is to be carried out.

(Method M70 for Producing Lithium Hydroxide)

As shown in (a) of FIG. 9, the method M70 for producing lithium hydroxide includes a drying step S71. The drying step S71 is a step of evaporating the solution obtained as a result of separation in the second filtering step S15 and drying the lithium hydroxide having been deposited. By carrying out the method M70 for producing lithium hydroxide, it is possible to obtain lithium hydroxide that is a solid.

(Method M80 for Producing Lithium Carbonate)

As shown in (b) of FIG. 9, the method M80 for producing lithium carbonate includes a carbon dioxide gas introduction step S81, a fourth filtering step S82, and a drying step S83.

The carbon dioxide gas introduction step S81 is a step that introduces carbon dioxide gas into the solution obtained as a result of separation in the second filtering step S15 so that lithium carbonate is precipitated in the solution.

The fourth filtering step S82 is a step that is to be carried out after the carbon dioxide gas introduction step S81. The fourth filtering step S82 is a step of separating, from the solution, the lithium carbonate precipitated in the solution, with use of a filter.

The drying step S83 is a step that is to be carried out after the fourth filtering step S82. The drying step S83 is a step of drying the lithium carbonate obtained as a result of separation in the fourth filtering step S82.

By carrying out the method M80 for producing lithium carbonate, it is possible to obtain lithium carbonate that is a solid.

CONCLUSION

As described above, by carrying out the method M70 for producing lithium hydroxide or the method M80 for producing lithium carbonate with use of the solution containing the lithium hydroxide obtained as the liquid phase through separation in the second filtering step S15, it is possible to produce lithium hydroxide or lithium carbonate each being a solid. Thus, the lithium hydroxide obtained as the liquid phase through the second filtering step S15 can be collected as a resource, without wasting the lithium hydroxide.

Note that, similarly to the separating method M50, each of the method M70 for producing lithium hydroxide and the method M80 for producing lithium carbonate can be included as a part of the production method M10.

Aspects of the present invention can also be expressed as follows:

In order to attain the foregoing object, a method in accordance with a first aspect of the present invention for producing a beryllium solution includes: a main heating step of dielectrically heating an acidic solution containing a starting material so as to produce a beryllium solution, the starting material being at least one of beryllium, an intermetallic compound containing beryllium, beryllium having a surface on which an oxidized layer is formed, and an intermetallic compound having a surface on which an oxidized layer is formed and containing beryllium.

It is possible to dissolve the starting material in the acidic solution with high energy efficiency by heating, through dielectric heating, the acidic solution containing at least one of beryllium, an intermetallic compound containing beryllium, beryllium having a surface on which an oxidized layer is formed, and an intermetallic compound having a surface on which an oxidized layer is formed and containing beryllium. Thus, with the production method in accordance with the first aspect, it is possible to provide a novel method for producing a beryllium solution with high energy efficiency.

A method in accordance with a second aspect of the present invention for producing a beryllium solution is configured such that, in the first aspect, the method includes a pre-heating step of dielectrically heating a basic solution containing the starting material, the pre-heating step being carried out before the main heating step.

By carrying out the pre-heating step before the main heating step, it is possible to dissolve the starting material that is difficult to be dissolved when being subjected to the main heating step alone. Therefore, it is possible to produce a solution from a starting material selectable from a wider variety of substances.

A method in accordance with a third aspect of the present invention for producing a beryllium solution is configured such that, in the first or second aspect, the method further includes: a first impurity removing step of removing, with use of an organic compound that adsorbs a first element, the first element from the beryllium solution obtained through the main heating step, the first impurity removing step being carried out after the main heating step.

By carrying out the first impurity removing step, it is possible to reduce the concentration of the first element in the beryllium solution. As a result, it is possible to reduce the concentration of the first element in the beryllium solution used to produce any of beryllium, beryllium hydroxide, and beryllium oxide. Examples of the first element encompass uranium, thorium, plutonium, and americium.

A method in accordance with a fourth aspect of the present invention for producing a beryllium solution is configured such that, in the third aspect, in the first impurity removing step, the organic compound is dissolved in an organic solvent, and the beryllium solution is acidic.

This configuration can enhance the efficiency at which the organic compound adsorbs the first element.

A method in accordance with a fifth aspect of the present invention for producing a beryllium solution is configured such that, in any of the first to fourth aspects, the method further includes a second impurity removing step of adjusting a polarity of the beryllium solution from acidity to basicity so as to remove a second element from the beryllium solution, the beryllium solution having been obtained through the main heating step, the second impurity removing step being carried out after the main heating step.

By carrying out the second impurity removing step, it is possible to reduce the concentration of the second element in the beryllium solution. As a result, it is possible to reduce the concentration of the second element in the beryllium solution used to produce any of beryllium, beryllium hydroxide, and beryllium oxide. Examples of the second element encompass aluminum and iron.

A method in accordance with a sixth aspect of the present invention for producing a beryllium solution is defined such that, in any of the first to fifth aspects, the main heating step dielectrically heats the acidic solution containing the starting material by applying a microwave to the acidic solution.

The technique of the dielectric heating involving use of a microwave (i.e., microwave dielectric heating) is a technique used for so-called microwave ovens, that is, a widely-used technique. Thus, the production method in accordance with the sixth aspect can reduce the cost required to carry out the production method, as compared to conventional production methods.

A method in accordance with a seventh aspect of the present invention for producing a beryllium solution is defined such that, in any of the first to sixth aspects, the beryllium solution is a beryllium chloride solution.

With the production method in accordance with the seventh aspect, it is possible to easily produce the beryllium chloride solution while skipping the phase of beryllium hydroxide. From the beryllium chloride solution, it is possible to easily produce beryllium, beryllium hydroxide, and beryllium oxide, as will be described later. Therefore, the beryllium chloride solution is suitable as the solution.

A method in accordance with an eighth aspect of the present invention for producing beryllium includes: each step included in the method recited in any of the first to sixth aspects for producing the beryllium solution; an anhydrization step of carrying out anhydrization of the beryllium solution so as to generate beryllium salt; and an electrolyzing step of carrying out molten salt electrolysis of the beryllium salt so as to generate beryllium.

A method in accordance with a tenth aspect of the present invention for producing beryllium hydroxide includes: each step included in the method in accordance with any one of the first to sixth aspects for producing the beryllium solution; and a neutralizing step of neutralizing, with a base, the beryllium solution so as to generate beryllium hydroxide.

A method in accordance with an eleventh aspect of the present invention for producing beryllium oxide includes: each step included in the method in accordance with any one of the first to sixth aspects for producing the beryllium solution; and a third heating step of heating the beryllium solution so as to generate beryllium oxide.

In accordance with these production methods, it is possible to produce beryllium, beryllium hydroxide, and beryllium oxide by a novel production method with high energy efficiency.

A method in accordance with a ninth aspect of the present invention for producing beryllium is configured such that, in the eighth aspect, the beryllium solution is a beryllium chloride solution, and the anhydrization step heats beryllium chloride hydrate contained in the beryllium chloride solution in a vacuum at a temperature of not lower than 80° C. and not higher than 110° C.

With this configuration, in a case where the beryllium solution is a beryllium chloride solution, it is possible to reliably carry out an anhydrization treatment on beryllium chloride hydrate.

A solution production device in accordance with a twelfth aspect of the present invention includes: a main heating container; an acidic solution supplying section configured to supply an acidic solution to the main heating container; and a main heating device configured to dielectrically heat the acidic solution stored in the main heating container.

In a case where the acidic solution contains a solute that is a starting material, it is possible to dissolve the starting material in the acidic solution with high energy efficiency by heating, through dielectric heating, the acidic solution stored in the main heating container. Thus, with the production device in accordance with the twelfth aspect, it is possible to provide a novel solution production device with high energy efficiency.

A solution production device in accordance with a thirteenth aspect of the present invention is further configured such that, in the twelfth aspect, the solution production device further includes: a raw material supplying section configured to supply a starting material to at least one of the main heating container and the acidic solution supplying section, the starting material being at least one of beryllium, an intermetallic compound containing beryllium, beryllium having a surface on which an oxidized layer is formed, and an intermetallic compound having a surface on which an oxidized layer is formed and containing beryllium.

It is possible to dissolve the starting material in the acidic solution with high energy efficiency by heating, through dielectric heating, the acidic solution containing at least one of beryllium, an intermetallic compound containing beryllium, beryllium having a surface on which an oxidized layer is formed, and an intermetallic compound having a surface on which an oxidized layer is formed and containing beryllium. Thus, with the production device in accordance with the thirteenth aspect, it is possible to provide a novel beryllium solution production device with high energy efficiency.

A solution production device in accordance with a fourteenth aspect of the present invention is further configured such that, in the twelfth aspect, the solution production device further includes: a pre-heating container; a basic solution supplying section configured to supply a basic solution to the pre-heating container; a raw material supplying section configured to supply the starting material to at least one of the pre-heating container and the basic solution supplying section; a pre-heating device configured to dielectrically heat the basic solution stored in the pre-heating container; and a discharging section configured to discharge the basic solution containing the starting material from the pre-heating container to the main heating container.

Some of the beryllium oxides are difficult to be dissolved in an acidic solution merely by dielectric heating in the acidic solution. By carrying out dielectric heating in a basic solution before dielectric heating in an acidic solution, even beryllium oxide that is difficult to be dissolved can be dissolved upon subjected to the dielectric heating in the acidic solution.

With the above configuration, after a basic solution containing beryllium oxide stored in a pre-heating container is subjected to dielectric heating, the basic solution containing the beryllium oxide thus subjected to the dielectric heating can be discharged into the main heating container. Thus, even in a case where the starting material is beryllium oxide that is difficult to be dissolved merely by dielectric heating in an acidic solution, it is possible to dissolve the starting material in the acidic solution.

A solution production device in accordance with a fifteenth aspect of the present invention is further configured such that, in any of the twelfth to fourteenth aspects, the main heating device dielectrically heats the acidic solution stored in the main heating container by applying a microwave to the acidic solution.

The above configuration brings about similar effects to those given by the beryllium solution production method in accordance with the fifth aspect.

A solution production device in accordance with a sixteenth aspect of the present invention is further configured such that, in any of the twelfth to fifteenth aspects, the solution is a beryllium chloride solution.

The above configuration brings about similar effects to those given by the beryllium solution production method in accordance with the sixth aspect.

A beryllium production system in accordance with a seventeenth aspect of the present invention includes: the solution production device in accordance with the sixteenth aspect; an anhydrization device configured to carry out anhydrization of the beryllium chloride solution so as to generate beryllium chloride; and an electrolyzing device configured to carry out molten salt electrolysis of the beryllium chloride so as to generate beryllium.

A beryllium hydroxide production system in accordance with an eighteenth aspect of the present invention includes: the solution production device in accordance with the sixteenth aspect; and a neutralization device configured to neutralize, with a base, the beryllium chloride solution so as to generate beryllium hydroxide.

A beryllium oxide production system in accordance with a nineteenth aspect of the present invention includes: the solution production device recited in paragraph [024]; and a third heating device configured to heat the beryllium chloride solution so as to generate beryllium oxide.

The above configurations bring about similar effects to those given by the seventh to ninth aspects.

Beryllium in accordance with a twentieth aspect of the present invention contains uranium at a concentration of less than 0.7 ppm.

Even after being used as a neutron multiplying material in a nuclear fusion reactor, beryllium containing uranium at a concentration of less than 0.7 ppm exhibits a uranium concentration lower than a threshold that determines whether shallow-land disposal is allowed. Thus, even when being used as a neutron multiplying material in a nuclear fusion reactor, beryllium in accordance with the twentieth aspect can be subjected to shallow-land disposal without any treatment.

ADDITIONAL REMARKS

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

M10: Production method (method for producing beryllium solution, production method for producing $BeCl_2$ solution)
S12: Main heating step
S17, S18: First, second impurity removing steps
M20, M30, M40: Methods for producing beryllium, beryllium hydroxide, and beryllium oxide
S21: Anhydrization step
S22: Electrolyzing step S31: Neutralizing step
S41: Heating step
M60: Production method (method for producing lithium solution, method for producing LiCl solution)
S62: Pre-heating step
S63: Main heating step
S64, S65: First, second impurity removing steps
20A: Production device (beryllium solution production device, BeCl$_2$ solution production device)
22$a$: Microwave oscillator (main heating device)
22$c$: Main heating container
F1: Feeder (raw material supplying section)
V1: Valve (part of acidic solution supplying section)
20B: Crystallizer
20C: Anhydrization device
20D: Electrolyzing device

The invention claimed is:

1. A method for producing a beryllium solution, comprising:
a main heating step of dielectrically heating an acidic solution containing a starting material so as to produce a beryllium solution, the starting material being at least one of beryllium, an intermetallic compound containing beryllium, beryllium having a surface on which an oxidized layer is formed, and an intermetallic compound having a surface on which an oxidized layer is formed and containing beryllium, wherein the method further comprises:
a pre-heating step of dielectrically heating a basic solution containing the starting material, the pre-heating step being carried out before the main heating step.

2. The method as set forth in claim 1, further comprising:
a first impurity removing step of removing, with use of an organic compound that adsorbs a first element, the first element from the beryllium solution obtained through the main heating step, the first impurity removing step being carried out after the main heating step.

3. The method as set forth in claim 2, wherein
in the first impurity removing step,
the organic compound is dissolved in an organic solvent, and
the beryllium solution is acidic.

4. The method as set forth in claim 1, further comprising:
a second impurity removing step of adjusting a polarity of the beryllium solution from acidity to basicity so as to remove a second element from the beryllium solution, the beryllium solution having been obtained through the main heating step, the second impurity removing step being carried out after the main heating step.

5. The method as set forth in claim 1, wherein
the main heating step dielectrically heats the acidic solution containing the starting material by applying a microwave to the acidic solution.

6. The method as set forth in claim 1, wherein
the beryllium solution is a beryllium chloride solution.

7. A method for producing beryllium hydroxide, comprising:
each step included in the method recited in claim 1; and
a neutralizing step of neutralizing, with a base, the beryllium solution so as to generate beryllium hydroxide.

8. A method for producing beryllium oxide, comprising:
each step included in the method recited in claim 1; and
a third heating step of heating the beryllium solution so as to generate beryllium oxide.

9. A method for producing beryllium, comprising:
each step included in the method recited in claim 1;
an anhydrization step of carrying out anhydrization of the beryllium solution so as to generate beryllium salt; and
an electrolyzing step of carrying out molten salt electrolysis of the beryllium salt so as to generate beryllium.

10. The method as set forth in claim 9, wherein
the beryllium solution is a beryllium chloride solution, and
the anhydrization step heats beryllium chloride hydrate contained in the beryllium chloride solution in a vacuum at a temperature of not lower than 80° C. and not higher than 110° C.

* * * * *